(12) United States Patent
Daniel

(10) Patent No.: US 6,907,159 B1
(45) Date of Patent: Jun. 14, 2005

(54) CONFIGURABLE OPTICAL ADD/DROP MULTIPLEXER WITH ENHANCED ADD CHANNEL CAPACITY

(75) Inventor: Hani S Daniel, Rockville, MD (US)

(73) Assignee: Broadband Royalty Corporation, Wilmington, DE (US)

( * ) Notice: Subject to any disclaimer, the term of this patent is extended or adjusted under 35 U.S.C. 154(b) by 125 days.

(21) Appl. No.: 10/370,113

(22) Filed: Feb. 21, 2003

Related U.S. Application Data

(60) Provisional application No. 60/357,853, filed on Feb. 21, 2002.

(51) Int. Cl.[7] ................................................ G02B 6/28
(52) U.S. Cl. .......................................... 385/24; 385/16
(58) Field of Search ........................... 385/16, 24, 115; 398/58–64

(56) References Cited

U.S. PATENT DOCUMENTS

| | | |
|---|---|---|
| 5,555,118 A | 9/1996 | Huber |
| 5,673,129 A | 9/1997 | Mizrahi |
| 5,726,788 A | 3/1998 | Fee et al. |
| 5,953,141 A | 9/1999 | Liu et al. |
| 5,982,518 A | 11/1999 | Mizrahi |
| 6,002,503 A | 12/1999 | Mizrahi |
| 6,134,036 A * | 10/2000 | Andreozzi et al. ............. 398/1 |
| 6,233,074 B1 * | 5/2001 | Lahat et al. .................. 398/79 |
| 6,292,605 B1 | 9/2001 | Bisson et al. |
| 6,674,935 B2 | 1/2004 | Kelly et al. |
| 6,721,509 B2 * | 4/2004 | Xiao et al. .................... 398/83 |
| 6,751,375 B1 * | 6/2004 | Meyer .......................... 385/27 |
| 2004/0042711 A1 * | 3/2004 | Bock et al. ................... 385/24 |

* cited by examiner

*Primary Examiner*—Juliana Kang
(74) *Attorney, Agent, or Firm*—Oblon, Spivak, McClelland, Maier & Neustadt, P.C.

(57) ABSTRACT

An arrangement is provided for a configurable optical add/drop multiplexer (OADM) assembly. The configurable OADM assembly comprises at least one configurable optical add/drop multiplexer (C-OADM) device and at least one optical switch associated with the C-OADM devices (the minimum configuration is only one C-OADM with bypass (expansion) switches). The switches can be configured so that some of the C-OADM devices can be selected to carry out wavelength operations. Each of the selected C-OADM devices may be further configured to perform wavelength manipulations such as dropping a wavelength channel, tapping a wavelength channel, adding a wavelength channel with full power level, and a combination thereof.

33 Claims, 16 Drawing Sheets

US 6,907,159 B1

CONFIGURABLE OPTICAL ADD/DROP MULTIPLEXER WITH ENHANCED ADD CHANNEL CAPACITY

This Application is based on Provisional Application No. 60/357,853 filed Feb. 21, 2002, the entire contents of which is hereby incorporated by reference. In addition, U.S. Utility patent application with U.S. patent application Ser. No. 10/286,975 and entitled "Configurable Optical Add/Drop Multiplexer With Partial Or Complete Wavelength Drop Capability", filed Nov. 4, 2002, is incorporated herein by reference.

BACKGROUND

1. Field of Invention

The present invention relates to a device and method for use in wavelength division multiplexed communications systems and systems incorporating the device. More specifically, the present invention relates to a device and method for extracting and adding information from and to wavelength division multiplexed systems, and systems incorporating the device.

2. Discussion of Related Art

Demand for optical communication systems is growing with the growing demand for faster and more reliable broadband networks. Wavelength division multiplexing (WDM) is one technique used to increase the capacity of optical communication systems. Such optical communication systems include, but are not limited to, telecommunication systems, cable television systems (CATV), and local area networks (LANs). An introduction to the field of Optical Communications can be found in "Optical Communication Systems" by Gowar, ed. Prentice Hall, N.Y., 1993.

WDM optical communication systems carry multiple optical signal channels, each channel being assigned a different wavelength. Optical signal channels are generated, multiplexed to form an optical signal comprised of the individual optical signal channels, and transmitted over a single waveguide such as an optical fiber. The optical signal is subsequently demultiplexed such that each individual channel is routed to a designated receiver.

Single or multiple optical channels can be routed to different destinations, such as in telecommunication networks, cable television subscriber systems and optical LANs. Routing is performed by selectively sending specific channels to a desired location. Such specific channels can be dropped at the desired location. In addition, another signal may be subsequently added to replace the dropped channel (alternatively, an unused channel can also be added.) This form of optical routing is generally referred to as "optical add/drop multiplexing" which is performed by an "optical add/drop multiplexer" or OADM.

Current OADMs allow a wavelength channel to be completely dropped from an optical signal. A "pay-as-you-grow" type of service paradigm is now in demand. In a metropolitan optical network utilized by telecom as well as cable systems, a higher degree of flexibility is often needed where a partial amount of a wavelength channel is required to be dropped while the remainder continues along the transmission line. Such an architecture enables wavelength sharing or wavelength broadcasting.

A higher degree of flexibility may become necessary in different situations. For instance, when traffic patterns change, drop capacity requirements may gradually increase until a complete wavelength drop may be needed at a particular location. In addition, when a service provider responds to increase demand and gradually upgrades allowed bandwidth, a smooth "in service" upgrade along a distribution path may require more wavelength channels to be dropped during the upgrading period. Furthermore, a more flexible content distribution scheme may require each location to have the capability of adding more channels carrying information to be transported to other locations.

SUMMARY

In accordance with the present invention, a configurable optical add/drop multiplexer (C-OADM) assembly is provided for flexible wavelength channel adding, dropping, tapping, and/or a combination thereof. The configurable OADM assembly includes one or more configurable optical add/drop multiplexer (C-OADM) devices, each of which may be designated to perform certain wavelength manipulations.

In an embodiment, the configurable OADM assembly is configurable in terms of both the arrangement of component C-OADM devices and which C-OADM devices are to be used to perform wavelength operations. In this embodiment, each C-OADM device is associated with a pair of optical switches connected to the input and output ports of the C-OADM device. One can select a C-OADM device to carry out certain wavelength operations by properly configuring the optical switches associated with the C-OADM device.

In accordance with another aspect of the invention, each C-OADM device may comprise a plurality of pathways, each of which may carry out a specific wavelength operation such as adding, dropping, and tapping a wavelength channel. Different pathways may overlap and may be set in operation at the same time. Some of the pathways may include one or more wavelength selection devices employed to recognize the wavelength channels to be manipulated. A plurality of optical switches are provided in each C-OADM device so that different pathways may be configured operative either individually or in combination to perform desired wavelength manipulation.

In another embodiment, each pathway in a C-OADM device may be designed to perform a pre-determined wavelength manipulation such as dropping a specific wavelength, tapping a specific wavelength, or adding a specific wavelength with full power level. Wavelength selection devices are used in such pathways and can be tuned to operate on designated wavelength channels. Wavelength selection devices in different pathways may be realized using thin film filters, fiber Bragg grating filters, Fabry-Perot and Arrayed Waveguide Grating Router based filters, Bulk diffraction gratings, Mach-Zenhder interferometers, ring resonators, sliding wedge filters, or any other wavelength-selective device.

In another different embodiment, a C-OADM device includes a plurality of pathways for simultaneously adding multiple wavelength channels, a plurality of pathways for simultaneously dropping multiple wavelength channels, and a plurality of pathways for simultaneously tapping multiple wavelength channels. Along those pathways, wavelength selection devices are configured to select corresponding wavelengths. Similarly, those wavelength selection devices may be implemented using thin film filters, fiber Bragg grating filters, Fabry-Perot and Arrayed Waveguide Grating Router based filters, Bulk diffraction gratings, Mach-Zenhder interferometers, ring resonators, sliding wedge filters, or any other wavelength-selective device.

In another embodiment, each C-OADM device that is may be further configured dynamically to perform desired wavelength manipulations. Operational parameters related to each pathway such as the wavelength to be selected may be adaptively configured according to particular needs. Tunable wavelength selection devices may be realized using tunable devices such as tunable fiber Bragg grating filters for which fiber gratings may be dynamically controlled to select a desired wavelength. Different pathways may also be dynamically configured to work together to achieve a desired combination of wavelength manipulations such as dropping a first wavelength from and adding a second wavelength to a received optical signal.

In yet another embodiment, a configurable OADM assembly may also be dynamically configured so that component C-OADM devices to be used to carry out wavelength operations may be re-configured when the need changes. At the same time, component C-OADM devices may also be re-configured whenever needed. The re-configuration may be applied at either one of the two different levels or at both levels.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Figure 1A:
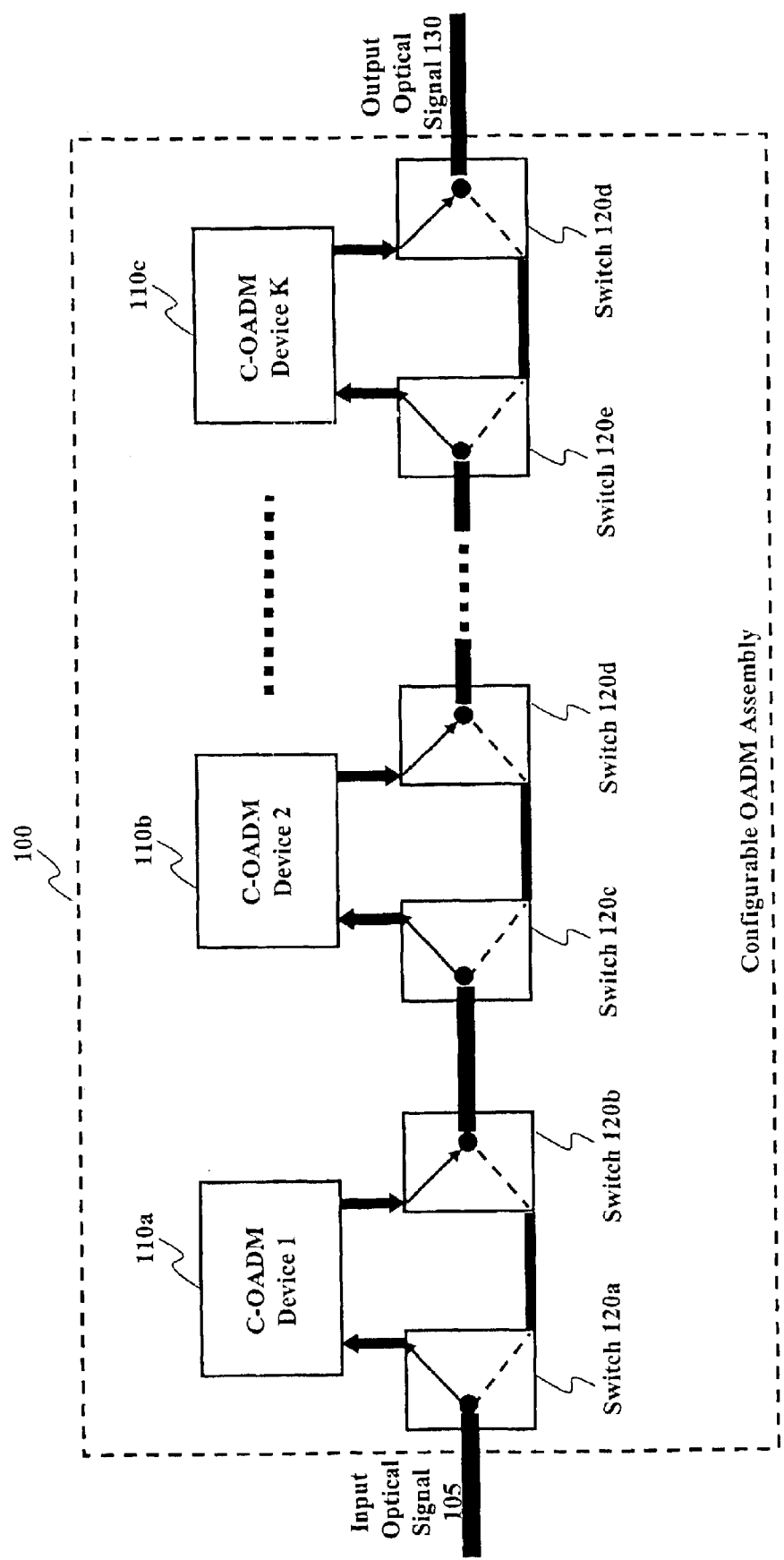
FIG. 1(a) depicts an exemplary architecture of a configurable optical wavelength add/drop multiplexer (C-OADM) assembly according to an embodiment of the present invention.

The present invention involves a configurable optical add/drop multiplexer (OADM) assembly that provides the flexibility of performing various configurable operations on wavelength channels carried in an optical communications system. The assembly comprises one or more configurable optical add/drop multiplexer (C-OADM) devices, each of which may perform certain operations on the wavelength channels contained in an optical signal.

The configurable OADM assembly may be configurable at two different levels. First, the assembly may be configured in terms of organizations of employed C-OADM devices. An organization of a serial, a parallel, or an integration of serial and parallel arrangements may be configured. Second, an individual C-OADM device in a particularly configured organization at the first level may be further configured in terms of how many and what specific operation(s) to be carried out.

Each C-OADM device may include multiple processing pathways, each is designed to perform a particular operation such as adding, dropping, or tapping a wavelength. Each pathway may be configured to operate on a particular wavelength. A C-OADM device may also support simultaneous dropping multiple channels, adding multiple channels, and tapping multiple channels. Wavelength channels may be added with full power.

A configurable OADM assembly may also be re-configured when needed. Re-configuration may involve one level re-configuration which may be either the first level re-configuration or the second level re-configuration. Re-configuration may also simultaneously involve both levels.

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on.

For purposes of the disclosure herein, computer-readable media may comprise any form of data storage mechanism, including such existing memory technologies as well as hardware or circuit representations of such structures and of such data.

FIG. 1 depicts an exemplary architecture of a configurable optical add/drop multiplexer (C-OADM) assembly 100, according to embodiments of the present invention. The configurable OADM assembly 100 comprises one or more configurable optical add/drop multiplexer (C-OADM) devices (C-OADM device 1 110a, C-OADM device 2 110b, ..., C-OADM device K 110c) and a plurality of connecting switches (switch 120a, switch 120b, switch 120c, switch 120d, ..., switch 120e, and switch 120f).

The configurable OADM assembly 100 takes an optical signal 105 as input and produces an optical signal 130 as its output. Depending on the configuration of the switches and the C-OADM devices, the output optical signal may differ from the input optical signal. Some of the wavelength channels in the input optical signal may be dropped. Some of the wavelength channels in the output optical signal may have been added. Some of the wavelength channels may have different power levels after traveling through the configurable OADM assembly 100. The exact difference between the input optical signal and the output optical signal may depend on how the configurable OADM assembly 100 is configured, which includes the configuration of the switches as well as the configuration of each of the C-OADM devices.

Each C-OADM device is connected to two switches. For example, the C-OADM device 1 110a is connected to the switch 120a and the switch 120b, the C-OADM device 2 110b is connected to the switch 120c and the switch 120d, ..., and the C-OADM device K 110c is connected to switch 120e and the switch 120f. Each pair of switches (e.g., the switch 120a and the switch 120b) is used to control whether their associated C-OADM device (e.g., the C-OADM device 1 110a) is to perform a certain wavelength operation on the passing optical signal. Each block formed by a C-OADM device (e.g., the C-OADM device 1 110a) and its associated switches (e.g., the switch 120a and the switch 120b) corresponds to an expansion block. Different wavelength operations may be performed by different expansion blocks.

Each expansion block may be configured according to processing needs. Such configuration may be performed at two different levels. One level is the configuration of the two switches connected to the underlying C-OADM device. Some of the switches may have a single input but two selectable outputs. For example, the switch 120a has a single input and two selectable outputs. Some switches may have two selectable inputs but one single output. For instance, the switch 120b has two selectable inputs and one single output.

The switches may be configured so that no wavelength operation is to be performed on the passing optical signal. In this case, the optical signal simply bypasses the underlying C-OADM device. For example, to bypass C-OADM device 1 110a, the switch 120a may be configured so that it selects one of its selectable outputs corresponding to a downward position and the switch 120b may be configured so that it selects one of its two selectable inputs corresponding also to a downward position. This particular configuration enables the input optical signal to simply travel through the two switches (without into the C-OADM 1 120a) and arrive at the single input port of the switch 120c of the next block.

A block may also be configured so that certain wavelength operation(s) can be performed on the passing optical signal. For example, when both the switch 120a and the switch 120b are configured to select upward positions, the switch 120a directs the input optical signal 105 to the C-OADM device 1 110a so that the C-OADM device 1 110a can carry out certain wavelength operation(s) on the passing optical signal. When the C-OADM device 1 120a produces its output, the upward input port of the switch 120b directs the output to the next expansion block, or to the input port of the switch 120c.

Different expansion blocks may be individually configured and are not required to have the same configuration. For example, the configurable OADM assembly 100 may be configured so that an input optical signal bypasses the first expansion block but not the other expansion blocks. A given configuration may change with time. The determination of a specific configuration at a particular time may be made according to application needs. That is, when the application needs change, the configuration may be adapted to meet the new needs.

Another level of configuration relates to what particular wavelength operation(s) each of the C-OADM devices may be designated to perform. In the preferred embodiments of the present invention, each of the C-OADM devices is capable of performing operations such as adding a wavelength channel, dropping a wavelength channel, tapping a wavelength channel, or a combination thereof.

Figure 1B:
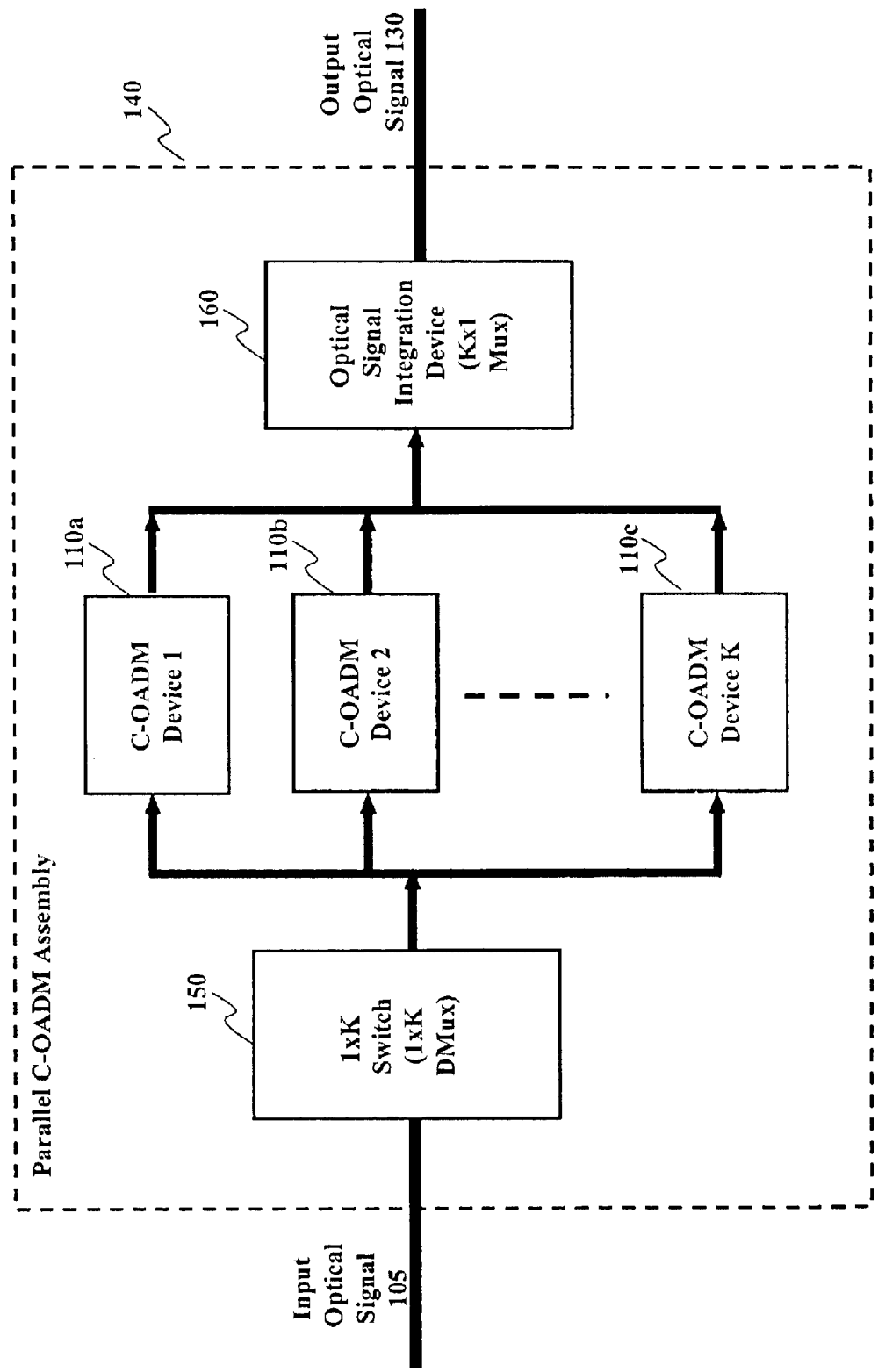
FIG. 1(b) depicts a different exemplary architecture of a C-OADM assembly according to an embodiment of the present invention.

In the assembly described in FIG. 1(a), different C-OADM devices are arranged in a serial fashion. In this case, operations performed by different devices are carried out one after the other. Other arrangements are also possible. FIG. 1(b) depicts a different exemplary architecture of a C-OADM assembly 140 where K different C-OADM devices are configured in a parallel arrangement, according to an embodiment of the present invention. The input optical signal enters a 1×K switch (which can be an optical demultiplexer) 150 that directs the optical signal to all the C-OADM devices. The outputs of the K C-OADM devices are combined by an optical signal integration device (or an K×1 multiplexer) 160 that appropriately merges the outputs of different C-OADM devices to form a single output optical signal.

Figure 1C:
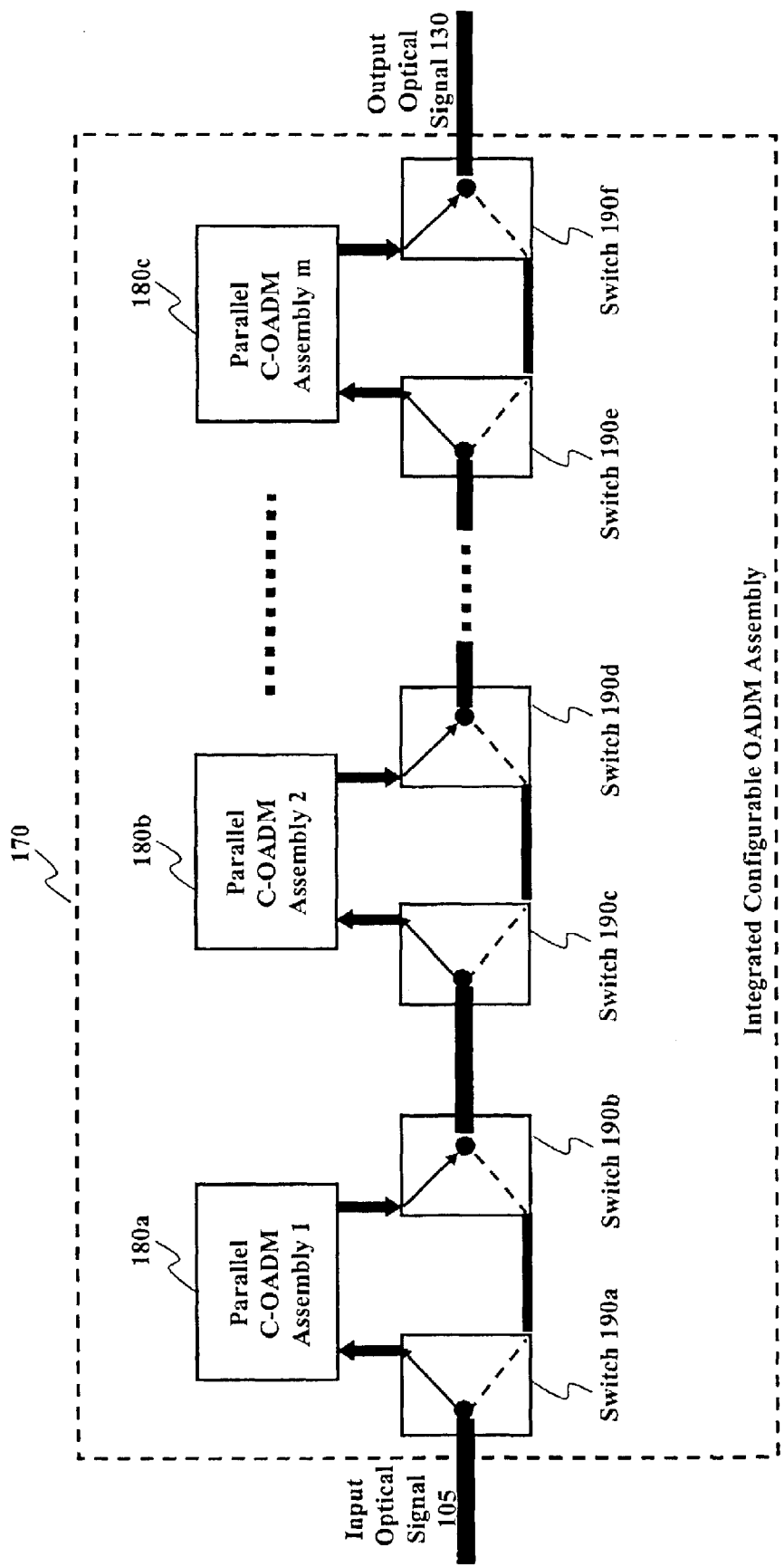
FIG. 1(c) depicts another exemplary architecture of a C-OADM assembly according to an embodiment of the present invention.

FIG. 1(c) depicts another exemplary architecture of a C-OADM assembly 170 in which different parallel C-OADM assemblies may be further configured in a serial fashion, according to embodiments of the present invention. In FIG. 1(c), parallel C-OADM assemblies (e.g., parallel C-OADM assembly 1 180a, parallel C-OADM assembly 2 180b, ..., parallel C-OADM assembly m 180c) may be connected via a plurality of switches (e.g., switch 190a and switch 190b associated with the parallel C-OADM assembly 1 180a, switch 190c and switch 190d associated with the parallel C-OADM assembly 180b, ..., and switch 190e and switch 190f associated with the parallel C-OADM assembly m 180c).

Each of the parallel C-OADM assemblies may be constructed in accordance with FIG. 1(b). A parallel C-OADM assembly (e.g., the parallel C-OADM assembly 1 180a) and its associated switches (e.g., the switch 190a and the switch 190b) form an expansion block. The configuration at the level of expansion blocks may be achieved through the switches in a similar fashion as described above. Within each parallel C-OADM assembly, a plurality of C-OADM devices may be included, each of which is capable of performing certain wavelength operations according to its internal configuration.

Figure 2:
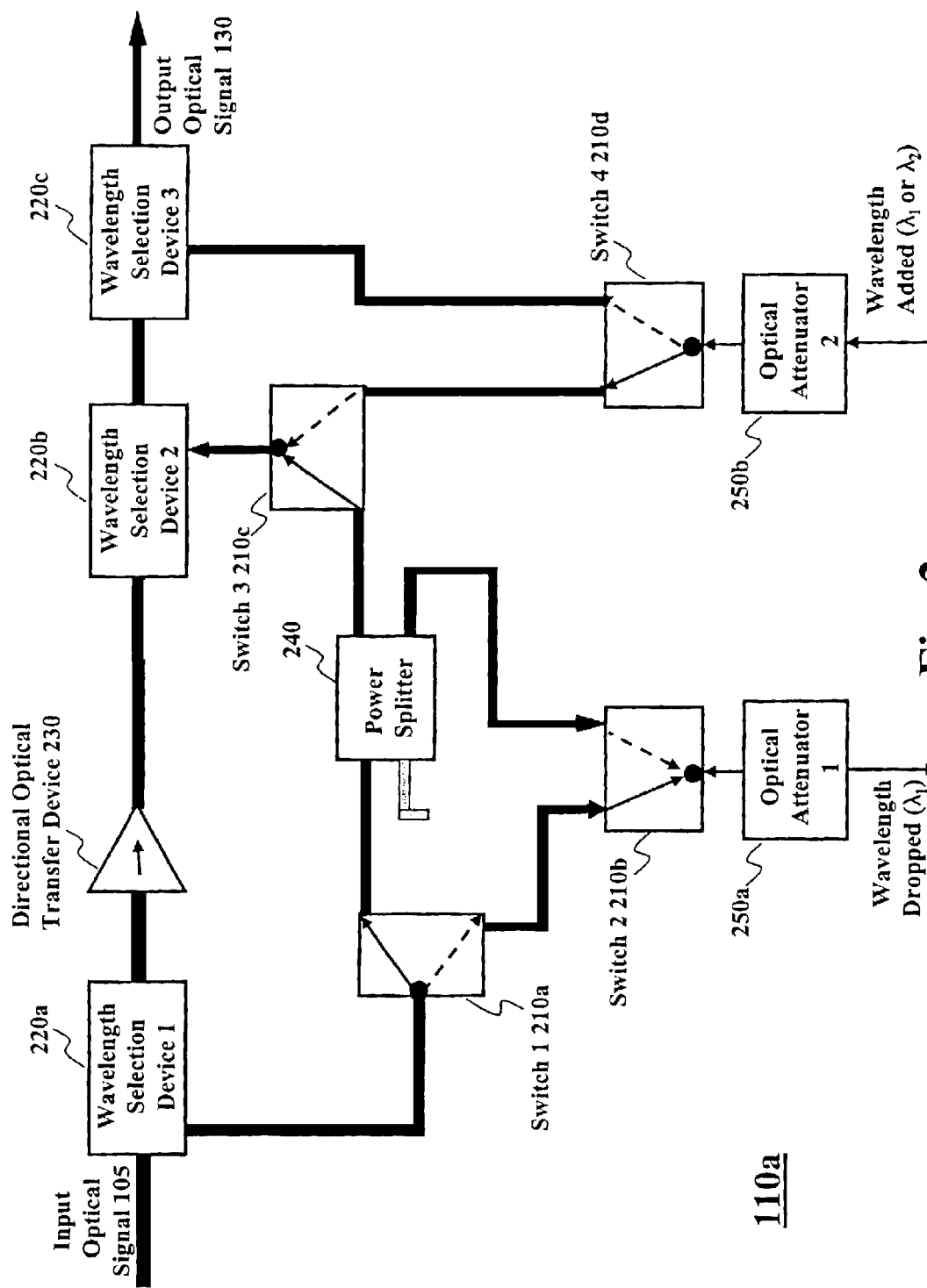
FIG. 2 depicts the schematics of a C-OADM device according to an embodiment of the present invention.

FIG. 2 depicts an exemplary schematic of an individual C-OADM device, according to an embodiment of the present invention. A C-OADM device (representatively, 110a) comprises a plurality of switches (switch 1 210a, switch 2 210b, switch 3 210c, and switch 4 210d), a plurality of wavelength selection devices (wavelength selection device 1 220a, wavelength selection device 2 220b, and wavelength selection device 3 220c), a directional optical transfer device 230, a power splitter 240, and, optionally, two optical attenuators 250a and 250b.

FIG. 2 schematically illustrates different processing pathways along which different wavelength operations may be carried out. For example, a wavelength drop operation may be carried out along the pathway formed by the wavelength selection device 1 220a, the switch 1 210a, the switch 2 210b, and optical attenuator 1 250a. (See below for a more detailed description of how this pathway achieves the wavelength drop.) At a particular time, one or more pathways may be in operation. Different pathways may be made operational through properly configuring the switches 210a, 210b, 210c, and 210d. The following discussion describes various different pathways with respect to wavelength operations that can be performed within the C-OADM device 110a.

A wavelength channel contained in an input wavelength division multiplexed optical signal forwarded to the C-OADM device 110a may be dropped in two scenarios. In one scenario, a wavelength channel (e.g., corresponding to wavelength $\lambda_1$) is completely (fully) dropped. In a different scenario, a fraction of the power at one wavelength is dropped after being tapped. In the former scenario, all other wavelength channels contained in the input optical signal except the one to be dropped pass through the C-OADM device 110a. In the latter scenario, the wavelength channel to be dropped is tapped first and then a portion of it with partial power is dropped. The other portion with the rest of the power passes through the C-OADM device 110a with a reduced power level. That is, all wavelength channels contained in the input optical signal pass through the C-OADM device 110a with one having a lower power level.

Fully dropping a wavelength is described below. This is achieved via a pathway formed by the wavelength selection device 1 220a, switch 1 210a, switch 2 210b, and the optical attenuator 1 250a. Along this pathway, a pre-determined wavelength channel is dropped fully and remaining wavelength channels travel through.

To enable this wavelength channel drop pathway, the switch 1 210a is configured to select its downward position output and the switch 2 210b is configured to point to the left input position. When the input optical signal enters the wavelength selection device 1 220a, the wavelength selection device 1 220a tuned to the wavelength to be dropped (e.g., wavelength $\lambda_1$) selects the wavelength channel and directs it to the switch 1 210a. Remaining wavelength channels are directed to the directional optical transfer device 230. Through wavelength selection, the wavelength to be fully dropped is singled out and separated from other remaining wavelength channels.

The separated wavelength channel is then directed from the switch 1 210a to the switch 2 210b. When the switch 2 210b is properly configured, it accepts the wavelength from the switch 1 210a and then directs it to the optical attenuator 1 250a. Depending on the application, the optical attenuator 250a may be optionally provided in situations where the wavelength channel to be dropped has been amplified along an optic fiber (e.g., by an optical amplifier) before reaching the C-OADM device 110a to prevent excess optical power at the drop receive site. The optical attenuator 1 250a drops the wavelength channel after it is attenuated.

The remaining wavelength channels continue to travel from the wavelength selection device 1 220a through the directional optical transfer device 230 and the wavelength selection device 2 220b and the wavelength selection device 3 220c before they exit the C-OADM device 110a. Neither the directional optical transfer device 230 nor the wavelength selection devices 2 220b and 3 220c interfere with the remaining wavelength channels. The directional optical transfer device 230 is a one-directional optical signal forwarding device and it is designed to allow an optical signal to travel in one designated direction (e.g., from left to right). It can be implemented using, for example, an optical isolator.

The wavelength selection device 2 220b is positioned in this pathway also for wavelength channel add purposes, which will be discussed below. The wavelength selection device 2 220b is placed in an opposite orientation with respect to the wavelength selection device 1 220a (will be shown in FIG. 4). The wavelength selection device 2 220b may be tuned or configured to some particular wavelength channel to be added. When the remaining wavelength channels in a drop scenario enter the wavelength selection device 2 220b, the wavelength selection device 2 220b simply serves as a conduit. The wavelength selection device 3 is positioned for similar purposes. The output optical signal 130 with remaining wavelength(s) may then exit the current expansion block.

In a different scenario, a wavelength channel may be partially dropped. In this case, the power of the wavelength channel is first split into two portions, each of which has a reduced level of power. Then one portion of the split signal is dropped. This is achieved along a pathway formed by the wavelength selection device 1 220a, the switch 1 210a, a power splitter 240, the switch 2 210b, and, optionally, the optical attenuator 1 250a. The retained portion is directed to a switch 3 210c which is properly configured to select its left position input port and forward the retained wavelength channel to the wavelength selection device 2 220b which is configured to accept the wavelength (e.g., wavelength $\lambda_1$). From there, the retained wavelength channel merges the other wavelength channels in the input optical signal and together travel through the wavelength selection device 3 220c to the exit as the output optical signal 130.

To enable the partial drop pathway, the switch 1 210a is configured to select its upper position output which directs the selected wavelength channel (by the wavelength selection device 1 220a) to the power splitter 240. When the power splitter 240 produces two portions of the wavelength channel, the portion to be dropped is directed to the switch 2 210b that is configured to select input from its right positioned input port. Through the switch 2 210b, the dropped portion of the wavelength is directed to the optionally optical attenuator 1 250a and subsequently dropped after it is attenuated to reach an appropriate power level.

The power splitter 240 may be configured to split the power by a desired ratio. For example, the power splitter 240 may be configured to split the incoming wavelength channel according to a 10 percent versus 90 percent power split. The portion corresponding to 90 percent of the original power may be forwarded on. The portion corresponding to the 10 percent power strength may be dropped. In this case, the portion with 10 percent of power level is directed to the switch 2 210b and the optical attenuator 1 250a.

A wavelength channel carrying information may be added to the transmission optical signal. Similar to the previously described different wavelength channel drop modes, a wavelength channel may be added in different ways. The illustrated embodiment of the C-OADM device 1 110a in FIG. 2 is capable of supporting adding up to two wavelength channels (e.g., corresponding to wavelengths $\lambda_1$ and $\lambda_2$). An added wavelength channel may enter C-OADM device 110a from an optical attenuator 2 250b.

Wavelength $\lambda_1$ to be added may be added via a pathway formed along a switch 4 210d, the switch 3 210c, the wavelength selection device 2 220b, and the wavelength selection device 3 220c. To form this pathway, the switch 4 210d is configured to select its left position output, the switch 3 210c is configured to select its right position input port. Along this pathway, the added wavelength channel $\lambda_1$ is selected by the wavelength selection device 2 220b (i.e., it is tuned to the wavelength $\lambda_1$). Another wavelength channel ($\lambda_2$) may be added via a different pathway formed along the switch 4 210d, and the wavelength selection device 3 220c. To activate this pathway, the switch 4 210d is configured to select its right position output which directs the added wavelength to the wavelength selection device 3 220c. The wavelength selection device 3 220c is tuned to select a wavelength channel with wavelength $\lambda_2$.

Depending on which wavelength drop pathway is operative, one or two wavelength channels may be added. For instance, if the full wavelength drop pathway is operative (i.e., wavelength channel $\lambda_1$ is fully dropped), either of wavelength channels ($\lambda_1$ or $\lambda_2$) may be added. If the partial drop pathway is operative (i.e., part of the wavelength $\lambda_1$ will still travel through the switch 3 210c), only wavelength $\lambda_2$ may be added (wavelength $\lambda_1$ is still part of the optical signal).

When adding wavelength channels to an input optical signal, the directional optical transfer device 230 may prevent the wavelength channel to be added to travel towards the wavelength selection device 1 220a. This may help to prevent potential cross talk introduced when the signal is allowed to travel in an opposite direction. Using the directional optical transfer device 230, such potential cross talk or the interference between the signal encoded in the wavelength channel added and the signal encoded in the original wavelength channels of the optical signal is minimized.

Different pathways may be in operation at the same time to perform a combination of the wavelength operations described above. Wavelength channels may be dropped and added at the same time. For example, if the wavelength selection device 1 220a is configured to select wavelength $\lambda_1$ and the wavelength selection device 3 220c is configured to select a different wavelength channel $\lambda_2$, when relevant switches are configured appropriately, wavelength channel $\lambda_1$ may be dropped from the input optical signal and the wavelength channel $\lambda_2$ may merge with the remaining wavelength channels at the wavelength selection device 3 220c. In this case, the output optical signal 130 contains the same number of wavelength channels as the input optical signal 105 but with different composition.

The C-OADM device 110a is capable of being configured to function in different operational modes, including a drop mode, an add mode, a tapping mode, an add/drop mode, a drop/tapping mode, an add/tapping mode, and an add/drop multiplexer mode. Different expansion blocks in the configurable OADM assembly 100 are therefore capable of being configured to operate in different modes so that the input optical signal may be manipulated at each block in different ways. For instance, the first block may be configured to drop a particular wavelength channel and add a signal on an un-used wavelength channel. The second block may be configured to further add more wavelength channels. Specific configuration may be determined according to application needs.

Different components in the C-OADM device 110a may be realized using various known existing technologies. For example, a wavelength selection device may be realized or implemented using a thin film filter, a fiber grating device such as a fiber Bragg grating, a Fabry-Perot, Bulk diffraction gratings, Mach-Zehnder interferometers, ring resonators, sliding wedge filters, or Arrayed Waveguide Grating Router based filters. An isolator may be used to implement the directional optical transfer device 230. A coupler may be used to implement the power splitter 240. Alternatively, different implementations may be utilized to realize components of the same type. For instance, one wavelength selection device may be realized using a thin film filter and the other two wavelength selection devices may utilize fiber Bragg grating devices.

Figure 3:
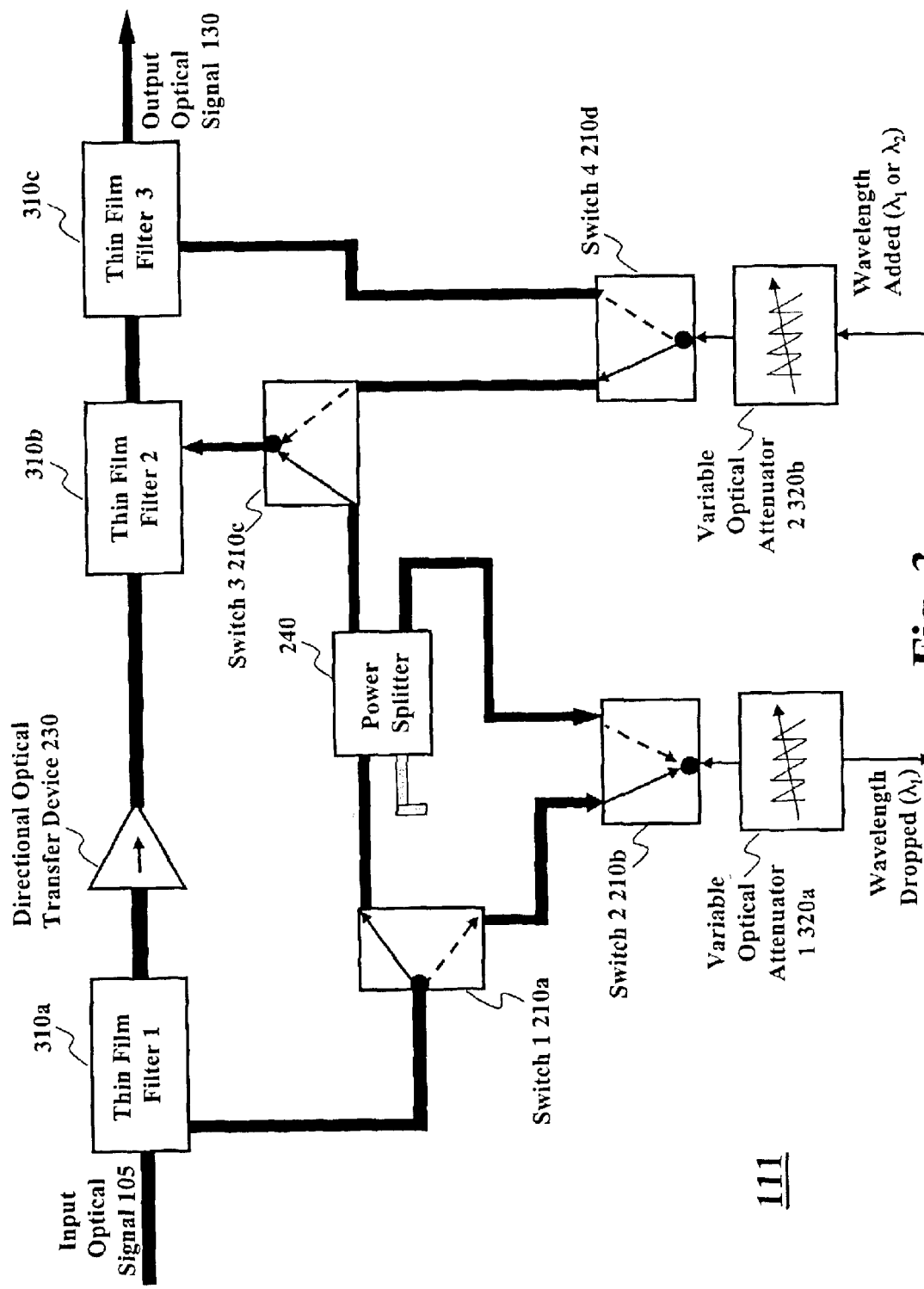
FIG. 3 depicts a first exemplary implementation of a C-OADM device according to an embodiment of the present invention.

FIG. 3 depicts an exemplary implementation of a C-OADM device 111, according to embodiments of the present invention. Each of the three wavelength selection devices (i.e., 220a, 220b, and 220c) are realized using a corresponding thin film filter: thin film filter 1 310a is used to realize the wavelength selection device 1 220a, thin film filter 2 310b is used to realize the wavelength selection mechanism 2 220b, and thin file filter 3 310c is used to realize the wavelength selection device 3 220c.

The optical attenuators (250a and 250b) may be implemented using variable optical attenuators (320a and 320b) to provide the flexibility of adjusting the amount of attenuation when needed.

Figure 4:
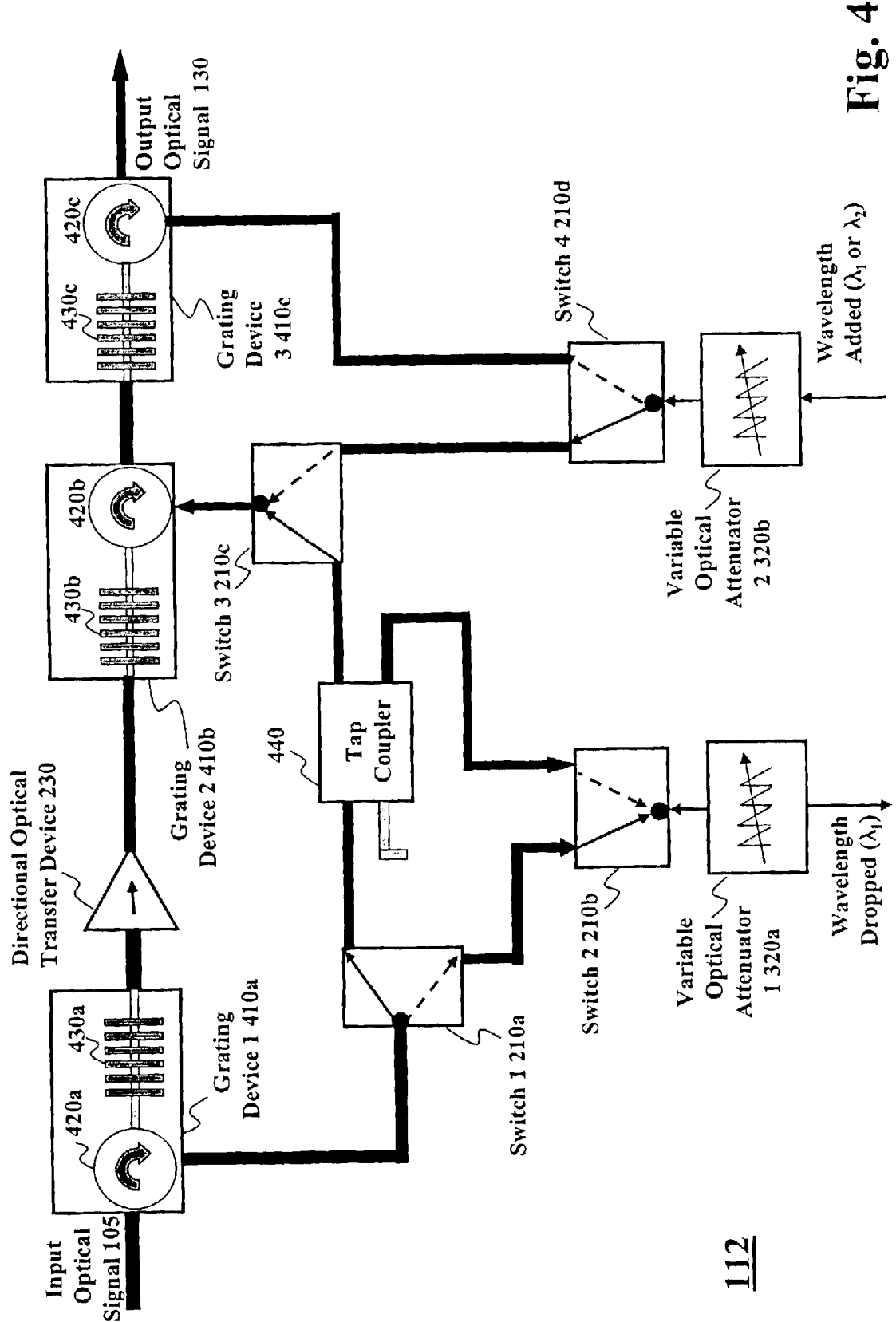
FIG. 4 depicts a second exemplary implementation of a C-OADM device according to an embodiment of the present invention.

FIG. 4 depicts a different exemplary implementation of a C-OADM device 112, according to embodiments of the present invention. The wavelength selection devices (i.e., 220a, 220b, and 220c in FIG. 2) are implemented using fiber grating devices (410a, 410b, and 410c). Each fiber grating device (e.g., the fiber Bragg grating device 1 410a) includes a circulator (e.g., 420a) and a, for example, fiber Bragg grating (e.g., 430a)

In the exemplary implementation illustrated in FIG. 4, the power splitter is realized using a tap coupler (440). In addition, the two optical attenuators are realized using variable optical attenuators (320a and 320b).

Figure 5A:
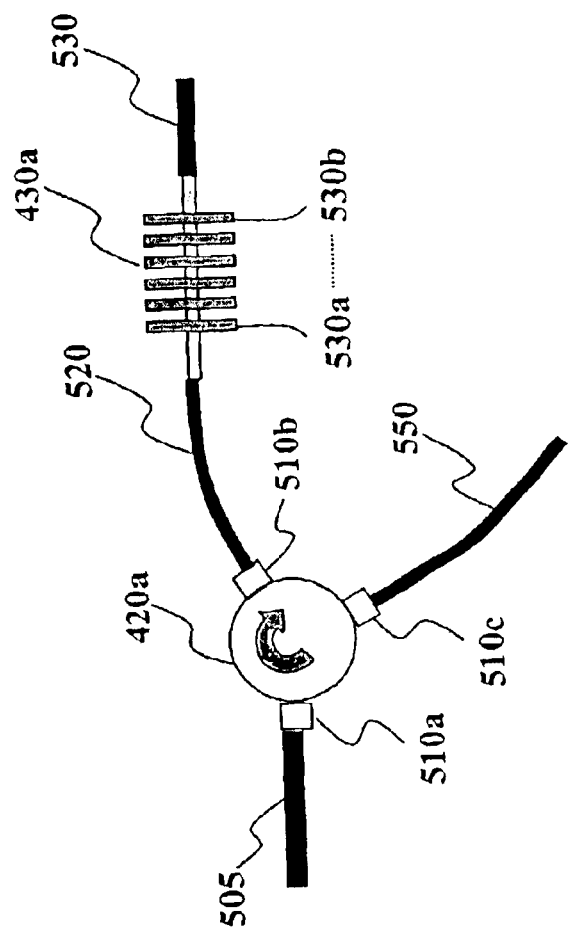
FIG. 5(a) illustrates in detail a mechanism of wavelength selection through a circulator and a grating.
Figure 5B:
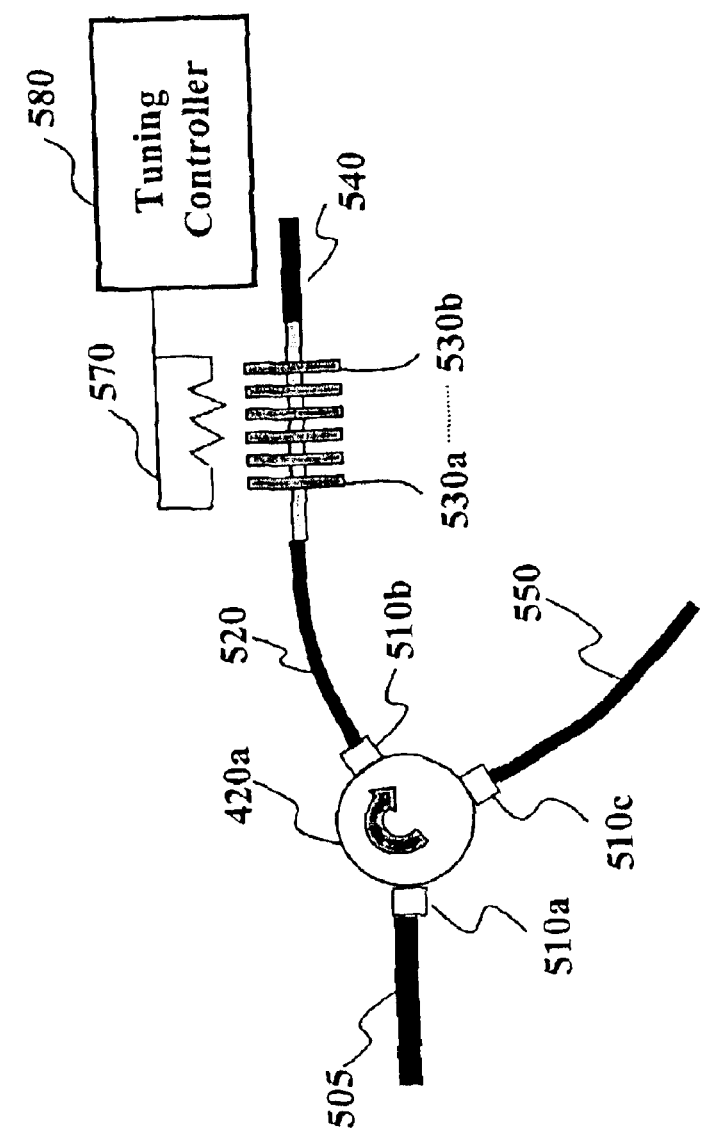
FIG. 5(b) illustrates in detail a mechanism of wavelength selection through a circulator and a grating with dynamic tuning control.

FIG. 5(b) illustrates how a circulator (e.g., the circulator 420a) coupled with a grating (e.g., the fiber grating 430a) achieves selection of wavelength channel. An optical signal enters the circulator 420a from optical fiber 505 to port 510a of the circulator 420a. The wavelength channels contained in the optical signal pass out of a port 510b and travel via an optical fiber 520 to a series of in-fiber grating elements 530a, ..., 530b. Each of the fiber grating elements 530a, ..., 530b may be tuned to a particular wavelength. If a grating element (e.g., 530a) is tuned to a particular wavelength, this grating element reflects a band of wavelengths centered on the tuned wavelength and allows other wavelengths outside of the band to pass through the optical fiber 530.

To use the fiber Bragg grating 430a to select a particular wavelength channel, one of the grating elements is tuned to reflect the particular wavelength. The reflected wavelength travels back to port 510b of the circulator 420a. The circulator 420a then directs the reflected (or selected) wavelength channel from its third port 510c to optical fiber 540. Here, circulator 420a serves as a directional transfer device. Therefore, it may also be implemented using a coupler possibly with an isolator (which serves as a directional transfer device).

The fiber grating elements 530a, . . . , 530b may also be dynamically adjusted. Such dynamic adjustment may be achieved through, for example, temperature or mechanical stretching. FIG. 5(b) illustrates an exemplary construct of a tunable fiber Bragg grating device 560, where the wavelength can be tuned through varying temperature.

In the exemplary tunable fiber Bragg grating device 560, there is a tuning controller (580) and a corresponding resistive heating element (570). Through the tuning controller 580, the desired wavelength to be selected or reflected can be adjusted. For instance, by adjusting the temperature via the resistive heating element 570 through the tuning controller 580, the wavelength to be selected or reflected by the tunable fiber Bragg grating device 560 can be dynamically adjusted.

Figure 6:
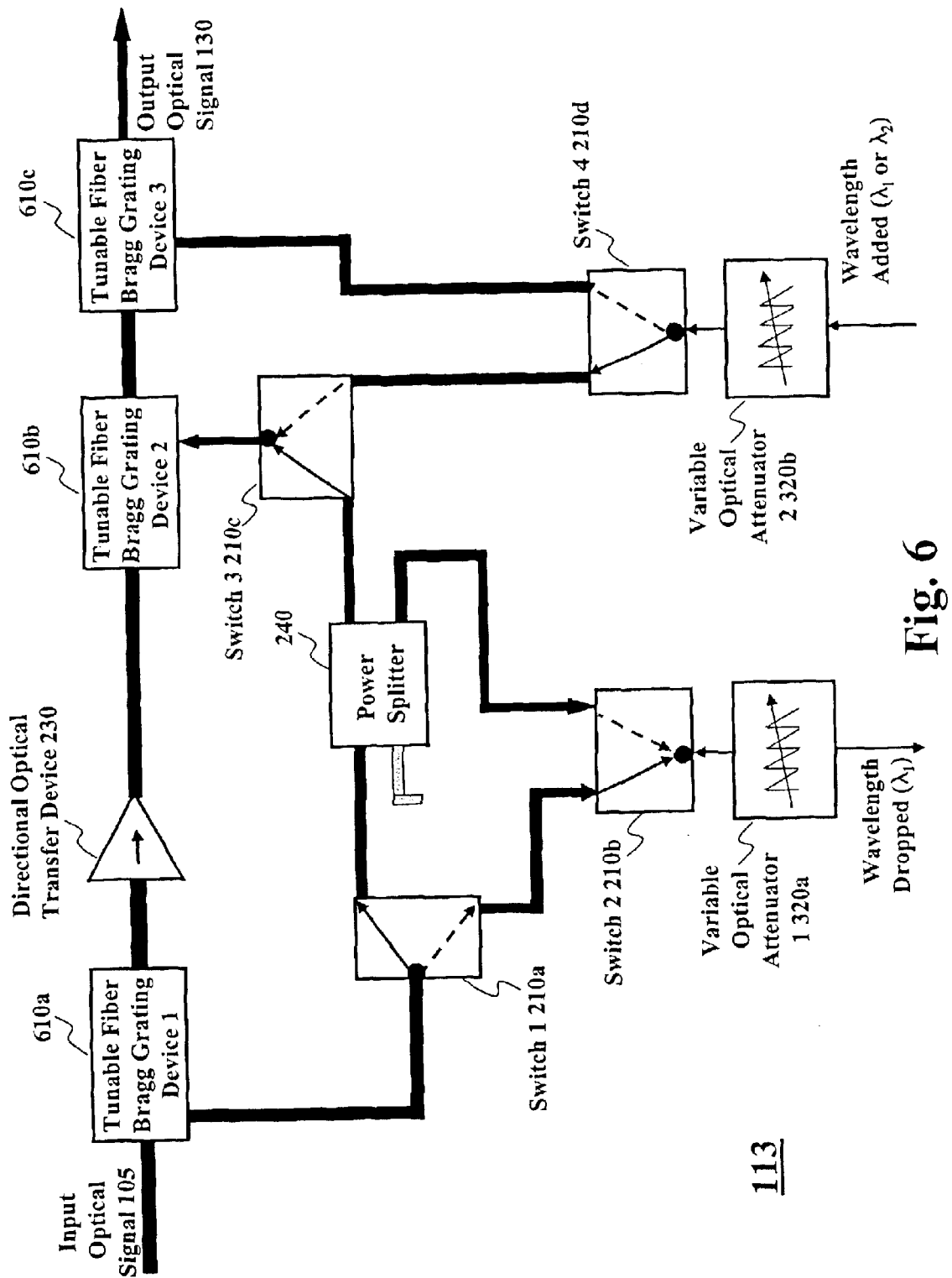
FIG. 6 depicts a third exemplary implementation of a C-OADM device according to an embodiment of the present invention.

FIG. 6 depicts another exemplary implementation of a C-OADM device 113, according to an embodiment of the present invention. In this embodiment, the wavelength selection devices are realized using tunable fiber Bragg grating devices 610a, 610b, and 610c. Each tunable fiber Bragg grating device may include a tuning controller and a corresponding resistive heating element. The desired wavelength to be selected or reflected is adjusted through the controller.

By using tunable fiber grating devices within the C-OADM device 113, the functionality achieved by the device can be configured according to dynamic needs. While the configurable OADM assembly 100 can be configured dynamically in terms of how many C-OADM devices are to be used to form a processing pipeline (through switches 120a, 120b, . . . , 120f, see FIG. 1), having the above described configurable features within each of the C-OADM devices provides additional flexibility in terms of what the configurable OADM assembly 100 can achieve.

Figure 7:
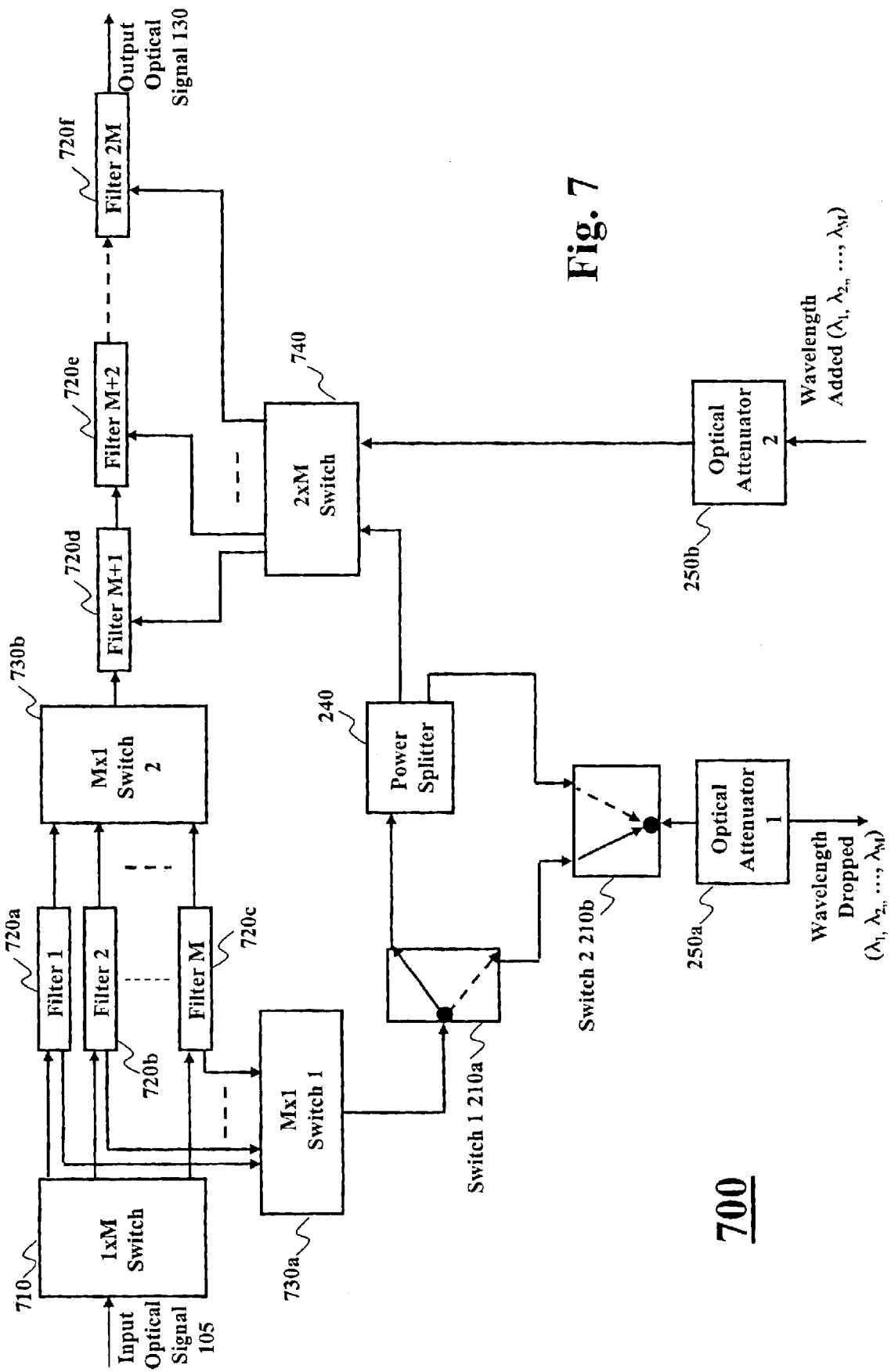
FIG. 7 depicts a fourth exemplary implementation of a C-OADM device according to an embodiment of the present invention.

FIG. 7 depicts a different exemplary architecture of a C-OADM device 700 according to an embodiment of the present invention. The C-OADM device 700 supports multiple wavelength channel dropping and multiple wavelength channel adding. In the illustrated embodiment, adding and dropping M simultaneous wavelength channels are illustrated. The C-OADM device 700 comprises a plurality of switches, a plurality of filters, a power splitter 240, and two optional optical attenuators 250a and 250b.

There are a total of 2×M filters and they are divided into two groups. One group includes filter 1 720a, filter 2 720b, . . . , and filter M 720c. Filters in this group are arranged in parallel. Each filter is configured to select a different wavelength and serves as a wavelength selection device. For example, the filter 1 720a may be tuned to select a channel of wavelength $\lambda_1$, the filter 2 720b may be tuned to select a channel of wavelength $\lambda_2$, . . . , and the filter M 720c may be tuned to select a channel of wavelength $\lambda_M$. This group of filters is configured to select wavelengths for wavelength dropping purposes.

The other group also includes M corresponding filters: filter M+1 720d, filter M+2 720e, . . . , and filter 2M 720f. Filters in this group are arranged in a serial fashion. Similarly, M filters in the second group may also be configured to select wavelengths $\lambda_1, \lambda_2, \ldots$, and $\lambda_M$, respectively. This group of filters is configured to select wavelengths for wavelength adding and tapping purposes.

Serving as wavelength selection devices, the filters in both groups may be implemented using various known techniques. This includes, but is not limited to, thin film filters, fiber Bragg grating filters, Fabry-Perot and Arrayed Waveguide Grating Router based filters, Bulk diffraction gratings, Mach-Zenhder interferometers, ring resonators, sliding wedge filters, or any other wavelength-selective devices.

There is a 1×M switch 710, that, upon receiving the input optical signal 105, directs the optical signal to either filter 1 720a, the filter 2 720b, . . . , and the filter M 720c. When the filter select a wavelength channels, such wavelength channel is directed to an M×1 switch 730a that further directs the wavelength channels to the switch 1 210a. If the switch 1 210a and the switch 2 210b are configured for a full drop, the selected wavelength channels are completely dropped along the pathway of the switch 1 210a, the switch 2 210b, and the optical attenuator 1 250a.

If a partial drop is intended, the switch 1 210a and the switch 2 210b are configured differently so that the switch 1 210a directs the selected wavelength channel to the power splitter 240. Two portions for each selected wavelength channel are produced by the power splitter 240. One portion is directed to the switch 2 210b which is configure to further forward this portion of the selected wavelengths to the optical attenuator 250a. The partial wavelength drops on all the selected wavelength channels are performed after the signals are attenuated.

The other portion of the selected wavelengths travel toward a 2×M switch 740 that directs each of its outputs to the entrances of M filters in the second group. Since the filters in the second group are configured to select the same wavelengths (as the filters in the first group), each of the tapped wavelengths is selected again by a corresponding filter in the second group. For example, when wavelength $\lambda_2$ is tapped and forwarded to filter M+2, since the filter M+2 is also configured to select wavelength $\lambda_2$, the tapped wavelength $\lambda_2$ travels through the filter M+2 and all subsequent filters in the second group.

The remaining wavelength channels in the input optical signal that are not selected by the filters in the first group travel through the filters toward a M×1 switch 730b where the remaining channels are merged and directed to the series of second group of M filters. In a partial drop scenario, those remaining wavelength channels merge with the tapped wavelength channel at appropriate filters (as described above) before exiting the C-OADM device 700.

To add a wavelength channel, the added wavelength enters the C-OADM device 700 through the optical attenuator 2 250b. The attenuated wavelength is then directed to the 2×M switch 740. Depending on the wavelength added, the 2×M switch 740 forwards the channel to one of the filters. For instance, if the added channel has a wavelength $\lambda_2$, the added wavelength may be directed to the filter M+2 720e that is tuned to select the wavelength $\lambda_2$.

Figure 8:
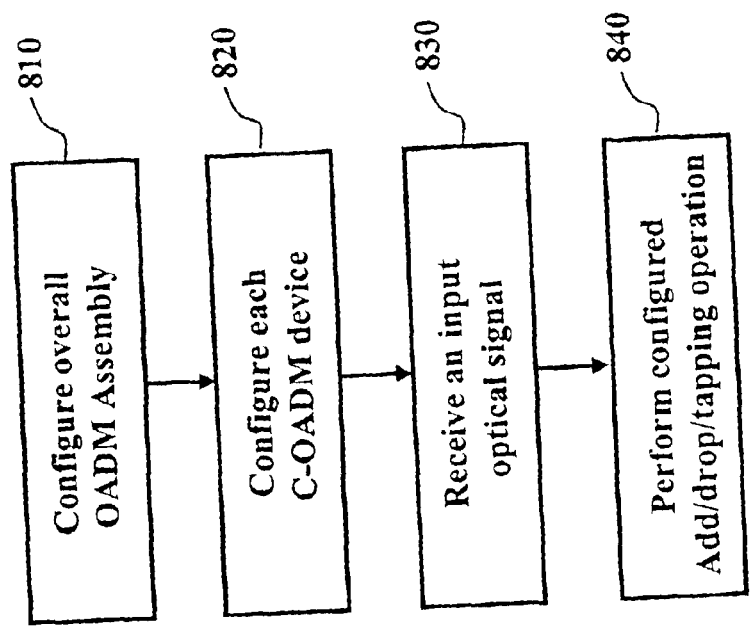
FIG. 8 is a flowchart of an exemplary process, in which a C-OADM device is configured to perform intended wavelength operations according to embodiments of the present invention.

FIG. 8 is a flowchart of an exemplary process, in which a configurable OADM assembly performs wavelength operations based on its configuration, according to embodiments of the present invention. The overall C-OADM assembly (e.g., 100) is first configured at act 810. This includes configuring each pair of the switches connected to each individual C-OADM device to form a desired processing pipeline. When a pair of switches is set to their upper positions, the associated C-OADM device is employed to perform a certain operation. When a pair of switches is set to their lower positions, the optical signal bypasses the associated C-OADM device.

Each of the C-OADM devices is then individually configured at act 820. This may include configuring the wavelength channels to be dropped, to be added, and determining whether certain channels are to be tapped. With a particular configuration, when an input optical signal is received at act 830, the configurable OADM assembly (100) performs, at act 840, the designated operations according to its configuration.

Figure 9:
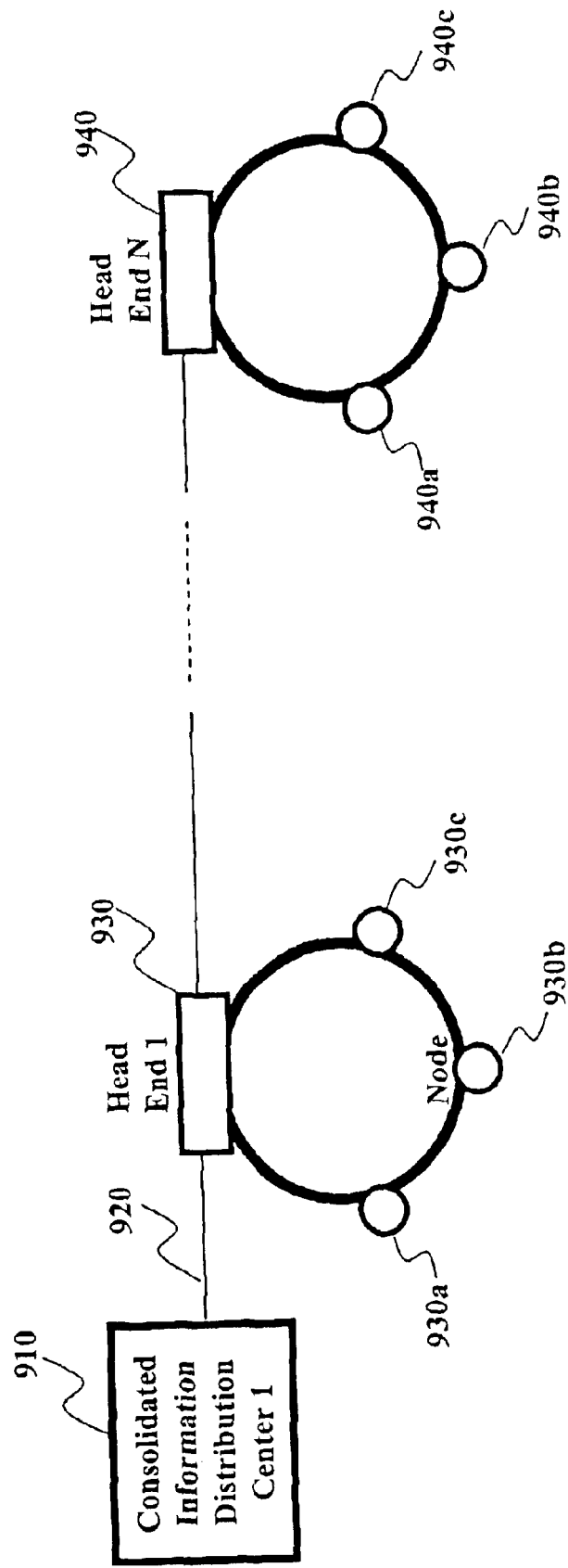
FIG. 9 depicts an exemplary consolidated information distribution framework in which each head end processes an optical signal via a C-OADM assembly, according to embodiments of the present invention.

FIG. 9 depicts an exemplary consolidated information distribution framework 900 in which each head end processes an optical signal using a configurable OADM assembly, according to embodiments of the present invention. The consolidated information distribution framework 900 comprises a consolidated information distribution center 910 and a plurality of head ends 930, . . . , 940. The consolidated information distribution center 910 distributes optically encoded information in the form of an optical signal to the head ends 930, . . . , 940 via an optical fiber 920. In this framework, each head end (e.g., 930) may include a plurality of nodes (e.g., 930a, 930b, . . . , 930c) and, upon receiving the information via the optical fiber 920, each head end distributes the content to its nodes, from where the content is sent to subscribers.

The consolidated information distribution center 910 may distribute information in different fashions. For example, it may broadcast information to all of its head ends. In this case, information is encoded in those wavelength channels that are to be accessed by all bead ends. The consolidated information distribution center 910 may also use disjoint dedicated wavelength(s) for each head end. In this case, each head end may be tuned to its dedicated wavelength(s) and may select only those dedicated wavelength channels from the passing optical signal.

The consolidated information distribution center 910 may also distribute information using both broadcast and dedicated channels. For example, certain information (e.g., broadcast news) may be distributed in a broadcast fashion using some wavelength(s) that are used for broadcasting purposes. In this case, each head end is tuned to such broadcast wavelength(s), taps the wavelength(s), and then passes on the wavelength(s) to the next head end. On the other hand, other types of information (e.g., video on demand) may be distributed using dedicated channels. This requires each head end be simultaneously tuned to the wavelength(s) that are dedicated to it. Therefore, each head end is tuned to both the broadcast channel(s) and its associated dedicated channel(s).

Figure 10:
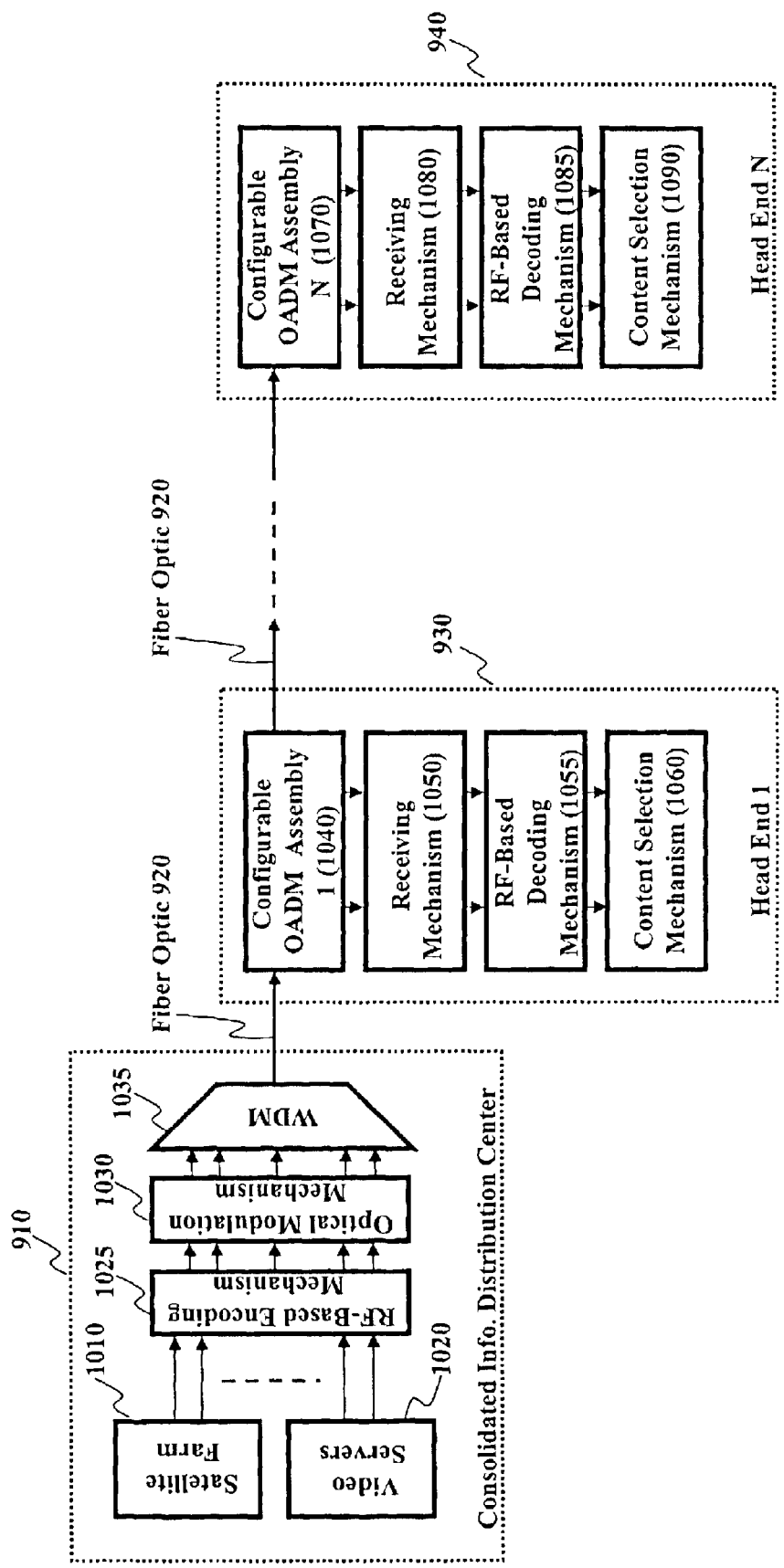
FIG. 10 shows the internal structure of a head end with a C-OADM assembly in relation to a consolidated information distribution center, according to embodiments of the present invention.

FIG. 10 shows an example of the internal structure of head ends in relation to the consolidated information distribution center 910 where each head end utilizes a configurable OADM assembly, according to embodiments of the present invention. At the consolidated information distribution center 910, information may be acquired through a satellite farm 1010 or may be from one or more video servers 1020. Such information is first converted to RF signals by an RF-based encoding mechanism 1025. The RF signals are then up-converted, by an optical modulation mechanism 1030, onto various optical carriers to produce different optical signals. A wavelength division multiplexer 1035 finally multiplexes the optical signals carried on various wavelength channels to generate a single optical signal, which is then sent to the head ends via the optical fiber 920.

The optical signal travels through the optical fiber 920 and reaches all the head ends. At each head end, a configurable OADM assembly is deployed to perform necessary processing. The head end 930 deploys a configurable OADM assembly 1040, . . . , the head end 940 deploys a configurable OADM assembly 1050. The configurable OADM assembly at each head end is configured so that desired information encoded in the optical signal can be accessed. For example, if the consolidated information distribution center 910 dedicates wavelength channels $\lambda_1$ to head end 930 and wavelength $\lambda_2$ to head end 940 (assuming neither head end shares any wavelength), the configurable OADM assembly 1040 may be configured to drop wavelength $\lambda_1$ when the optical signal passes through and forward other wavelength(s) to other head ends. At head end 940, the configurable OADM assembly 1070 is configured to drop wavelength $\lambda_2$ from the passing optical signal.

When the consolidated information distribution center 910 sends information to the head ends via a shared wavelength (e.g., as a broadcast channel), all the configurable OADM assemblies associated with the head ends are configured to tap the optical signal to obtain the broadcast information. When each head end simultaneously has some dedicated wavelength(s), its configurable OADM assembly is also set up so that such dedicated wavelength(s) can be dropped from the tapped optical signal.

At each head end, a dropped wavelength (either after tapping or without tapping) is down-converted to RF signals. This is achieved by a receiving mechanism within each head end (1050, . . . , 1080). The RF signals are further decoded through a corresponding RF-based decoding mechanism (1055, . . . , 1085) to produce modulated signals. A content selection mechanism in each head end (1060, . . . , 1090) then selects appropriate content and distributes to its nodes.

Figure 11:
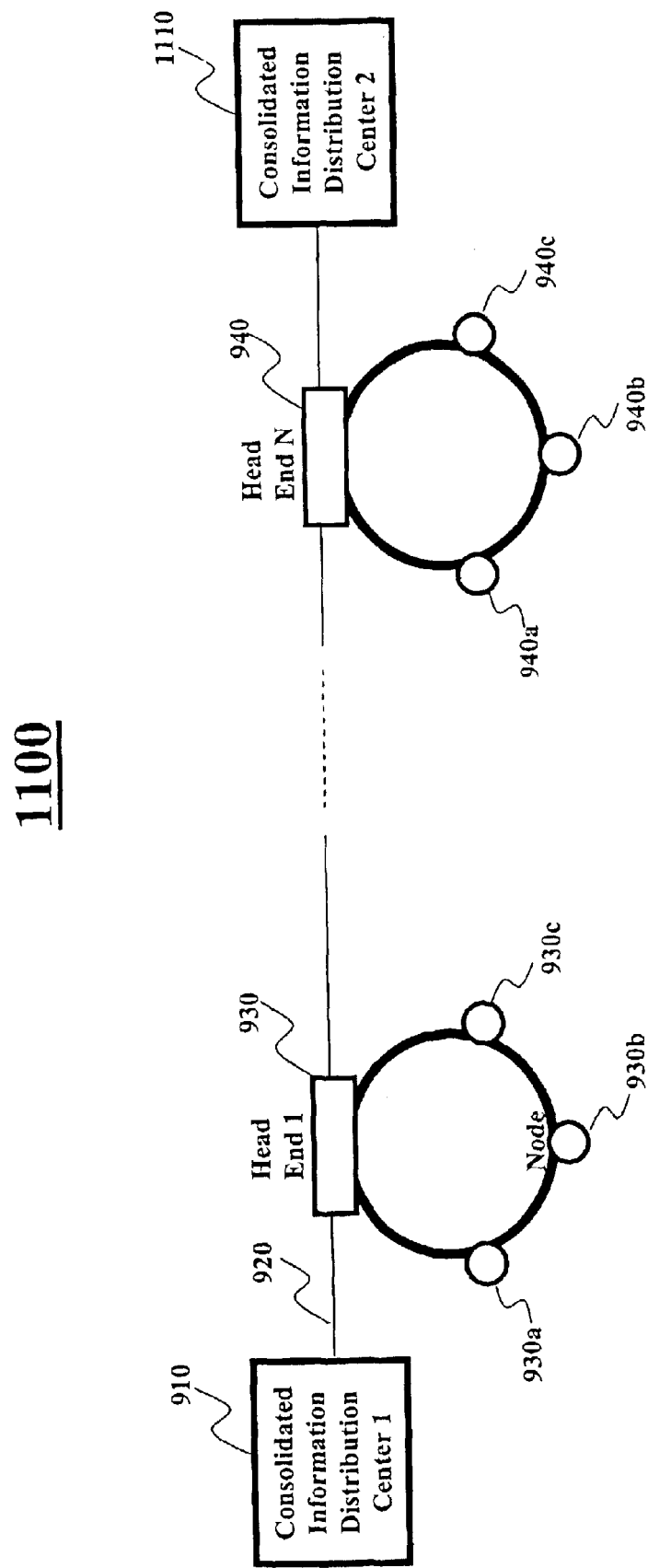
FIG. 11 depicts an alternative consolidated information distribution framework with dual consolidated information distribution centers, in which each head end processes an optical signal from one of two sources via a C-OADM assembly, according to embodiments of the present invention.

FIG. 11 depicts an alternative fault tolerant consolidated information distribution framework 1100 in which each head end processes an optical signal from one of two consolidated information distribution centers via a configurable OADM assembly, according to embodiments of the present invention. In the framework 1100, an additional consolidated information distribution center 2 1110 is provided which sends an optical signal encoded with the same information as what is encoded in the optical signal from the consolidated information distribution center 1 910. Both distribution centers 910 and 1110 send their optical signals via the optical fiber 920 to the head ends but in opposite directions.

The head ends are capable of receiving an optical signal from either one of the centers. A default distribution center may be defined (e.g., the consolidated information distribution center 1 may be defined as the default distribution center). The head ends may be set up so that in normal situations they receive an optical signal from the default distribution center. When the default center is in error or becomes non-operational, the head ends may alternatively switch to receive the optical signal sent from the consolidated information distribution center 2 1110.

Figure 12:
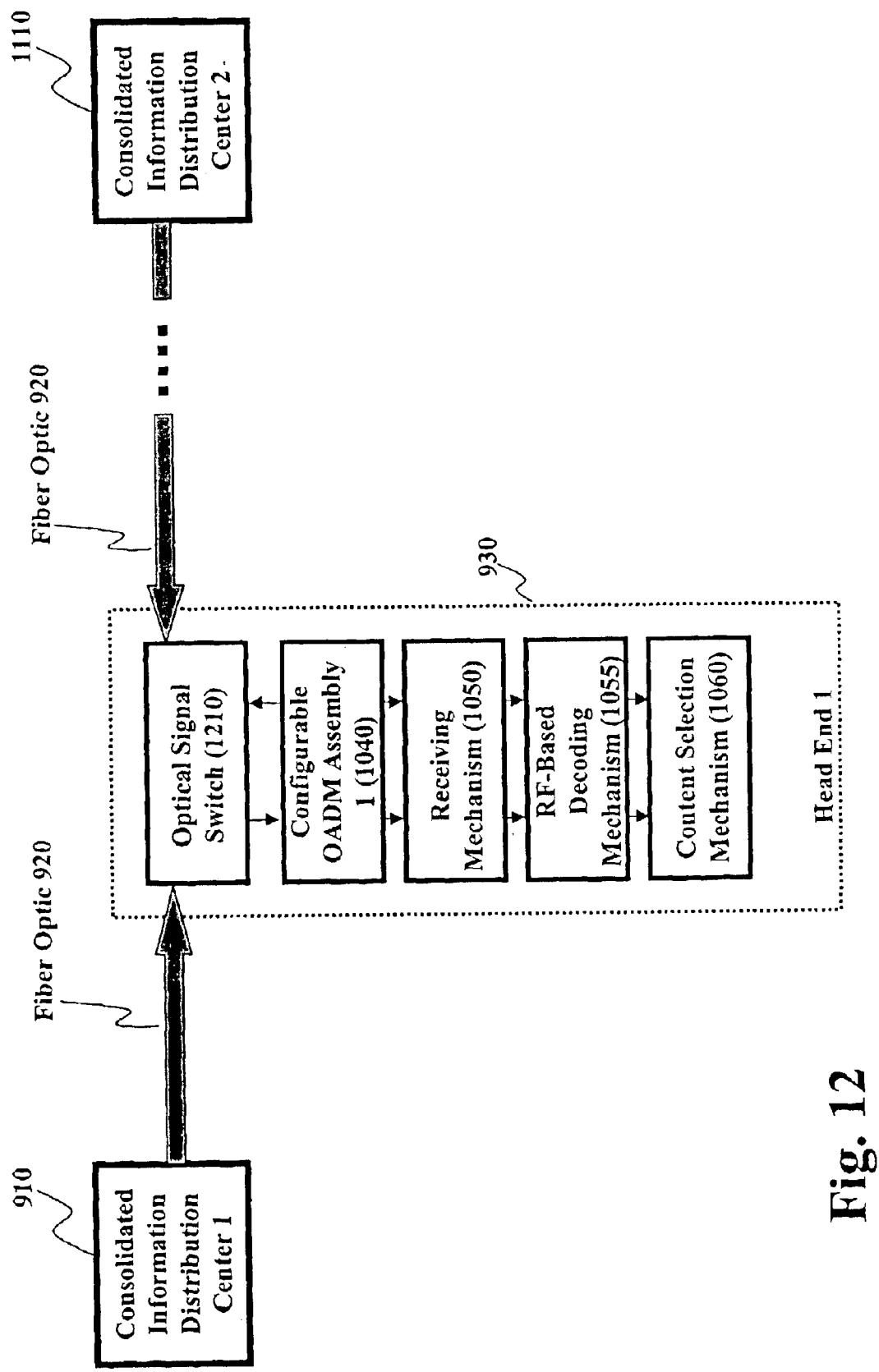
FIG. 12 shows the internal structure of a head end in relation to two consolidated information distribution centers, according to embodiments of the present invention.

FIG. 12 shows the internal structure of a head end (e.g., the head end 930) in the alternative consolidated information distribution framework 1100, according to embodiments of the present invention. When an optical signal is received, a head end (e.g., head end 1 930) uses an optical signal switch 1210 positioned in front of the configurable OADM assembly 1 1040 to select a source of information. For example, the optical switch 1210 may select either the consolidated information distribution center 1 910 as a source of information. The optical signal switch 1210 passes an optical signal from the selected source (910 or 1110) to the configurable OADM assembly 1 1040 and further forwards the output of the configurable OADM assembly 1 1040 to the next head end.

Other alternative information distribution frameworks may also be employed (not shown). For example, the consolidated information distribution center and the head ends may be arranged in a star or a ring configuration. Fault tolerant solutions discussed above may also be incorporated into these alternative system configurations.

Figure 13:
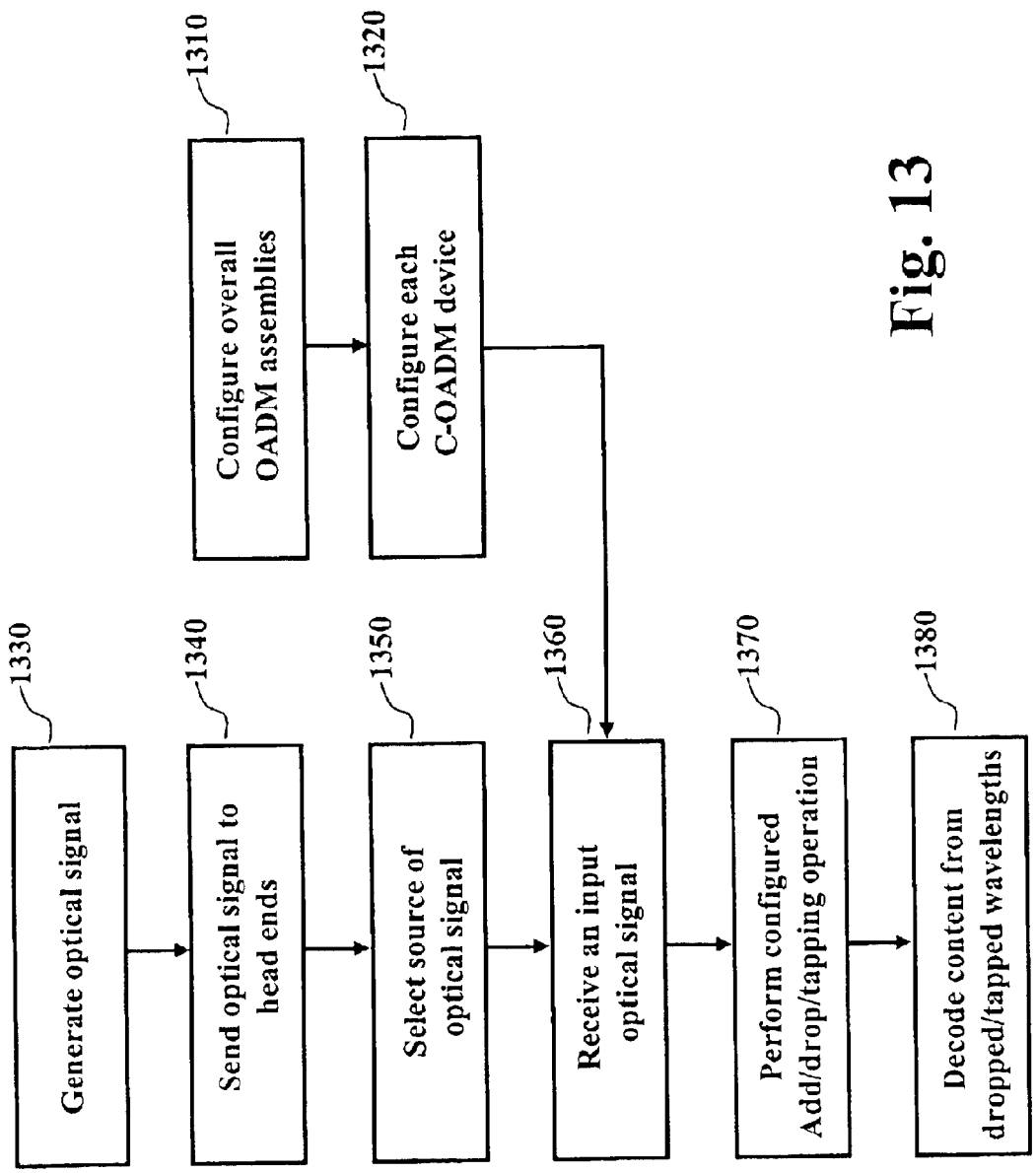
FIG. 13 is a flowchart of an exemplary process, in which content is delivered from a consolidated information distribution center to head ends by utilizing C-OADM assemblies, according to embodiments of the present invention.

FIG. 13 is a flowchart of an exemplary process, in which head ends in a consolidated information distribution framework utilize configurable OADM assemblies to processing an optical signal, according to embodiments of the present invention. The configurable OADM assemblies associated with all the head ends are first configured according to, for example, the allocation of wavelength channels within the distribution framework. This involves configuring, at act 1310, each of the individual configurable OADM assemblies. The configuration at this level may be determined according to factors such as how many wavelength channels are dedicated to each bead end or whether there is any wavelength for broadcast purposes. Configuration performed at act 1310 sets up the number of C-OADM devices to be used within each configurable OADM assembly.

The C-OADM devices within each configurable OADM assembly are then individually configured at act 1320. After the C-OADM assemblies associated with head ends are properly configured and become operational, the consolidated information distribution center (e.g., 910) generates, at act 1330, an optical signal that encodes information to be distributed to all the head ends. The distribution center 910 then sends, at act 1340, the optical signal to the head ends along the optical fiber 920.

When there is a second consolidated information distribution center (e.g., 1110) present, each head end first selects, at act 1350, the source from which an optical signal is to be received. When the optical signal from the selected source is received, at act 1360, the configurable OADM assembly within each head end performs, at act 1370, designated add/drop multiplexer operations on the optical signal. At each head end, the desired information is then decoded, at act 1380, from the wavelength(s) dropped or tapped by its configurable OADM assembly.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

I claim:

1. A configurable add/drop multiplexer (C-OADM) device, comprising:
   a plurality of optical switches configured to select one or more operational modes, wherein some of the optical switches have an input and first and second selectable outputs and some of the optical switches have first and second selectable inputs and an output;
   a wavelength drop pathway allowing a wavelength channel contained in an input optical signal to be dropped;
   a wavelength tapping pathway allowing a wavelength channel contained in the input optical signal to be partially tapped and partially dropped;
   a first wavelength add pathway allowing adding a first wavelength channel to the input optical signal; and
   a second wavelength add pathway allowing adding a second wavelength channel to the input optical signal.

2. The device according to claim 1, wherein the one or more operational modes include at least one of
   a drop mode;
   a tapping mode;
   an add mode;
   an add/drop mode; and
   an add/tapping mode.

3. The device according to claim 2, wherein
   the wavelength drop pathway operates when the optical switches are configured to select one of the drop mode and the add/drop mode;
   the wavelength tapping pathway operates when the optical switches are configured to select one of the tapping mode and the add/tapping mode;
   the first wavelength add pathway operates when the optical switches are configured to select one of the add mode and the add/drop mode; and
   the second wavelength add pathway operates when the optical switches are configured to select one of the add mode, the add/tapping mode, and the add/drop mode.

4. The device according to claim 3, wherein the wavelength drop pathway comprises:
   a first wavelength selection device receiving the input optical signal;
   a first optical switch with its input connecting to the first wavelength selection device and being configured to select its second selectable output; and
   a second optical switch connecting, through its first selectable input, to the second selectable output of the first optical switch, wherein
   the first wavelength selection device is capable of separating a wavelength channel to be dropped from the received input optical signal, directing the separated wavelength channel to the first optical switch, and
   producing an updated optical signal with at least one remaining wavelength channel after the wavelength channel to be dropped is separated.

5. The device according to claim 4, further comprising:
   a directional optical transfer device with its input connecting to the first wavelength selection device; and
   a second wavelength selection device connecting to the output of the directional optical transfer device, wherein
   the directional optical transfer device and the second wavelength selection device form a pathway for the updated optical signal to travel through.

6. The device according to claim 5, wherein the first and the second wavelength selection device comprises one of
   a thin film filter; and
   a fiber Bragg grating filter.

7. The device according to claim 6, wherein the fiber Bragg grating filter has a tunable controller through which the wavelength that the grating reflects can be adjusted.

8. The device according to claim 4, further comprising a first optical attenuator connecting to the output of the second optical switch, wherein the first optical attenuator is capable of receiving the wavelength channel to be dropped from the output of the second optical switch and attenuating the wavelength channel before dropping the wavelength channel.

9. The device according to claim 8, wherein the first optical attenuator is a variable optical attenuator.

10. The device according to claim 4, wherein the wavelength tapping pathway comprises:
    the first wavelength selection device receiving the input optical signal;
    the first optical switch with its input connecting to the first wavelength selection device and being configured to select its first selectable output;

a power splitter with its input connecting to the first selectable output of the first optical switch; and the second optical switch being configured to select its second selectable input connecting to one of the outputs of the power splitter, wherein the power splitter is capable of splitting the power of a wavelength channel, selected by the first wavelength selection device and received via the first selectable output of the first optical switch, to produce two portions of the selected wavelength channel, each of the portions corresponding to a certain amount of power of the selected wavelength channel.

11. The device according to claim 10, wherein the power splitter is a coupler.

12. The device according to claim 10, further comprising a first optical attenuator connecting to the output of the second optical switch, receiving one portion of the selected wavelength channel, and attenuating the received portion of the selected wavelength channel before dropping the portion of the selected wavelength channel.

13. The device according to claim 12, further comprising a third optical switch be configured to select its first selectable input connecting to the power splitter to receive the other portion of the selected wavelength channel and direct the other portion of the selected wavelength channel to a second wavelength selection device.

14. The device according to claim 13, wherein the first wavelength add pathway comprises:

a second attenuator receiving a first wavelength to be added;

a fourth optical switch with its input connecting to the second attenuator to receive the first wavelength and being configured to select its first selectable output;

the third optical switch being configured to connect its second selectable input to the first selectable output of the fourth optical switch to receive and to direct the first wavelength; and a second wavelength selection device connecting to the output of the third optical switch, wherein the second attenuator attenuates the first wavelength before the first wavelength is to be added, and the second wavelength selection device allows the first wavelength to be added to the input optical signal.

15. The device according to claim 14, wherein the second wavelength add pathway comprises:

the second attenuator receiving a second wavelength to be added;

the fourth optical switch with its input connecting to the second attenuator to receive the second wavelength and being configured to select its second selectable output; and a third wavelength selection device connecting to the second selectable output of the fourth optical switch, wherein the second attenuator attenuates the second wavelength before the second wavelength is to be added, and the third wavelength selection device allows the second wavelength to be added to the input optical signal.

16. A configurable optical add/drop multiplexer device, comprising:

a plurality of optical switches to select one or more operational modes;

a plurality of wavelength drop pathways, each of which allows a corresponding wavelength channel contained in an input optical signal to be dropped;

a plurality of wavelength tapping pathways, each of which allows a corresponding wavelength channel contained in the input optical signal to be partially tapped and partially dropped; and a plurality of wavelength add pathways, each of which allows a corresponding wavelength channel to be added to the input optical signal.

17. The device according to claim 16, wherein the optical switches include:

a 1×M optical switch that receives the input optical signal at its input port and directs the received input optical signal to M output ports;

two M×1 optical switches, each of which directs the optical signals received at one of its M input ports to its single output port; and a 2×M optical switch, directing optical signals received at its two input ports to one of its M output ports.

18. The device according to claim 17, wherein the one or more operational modes include at least some of a drop mode;

a tapping mode;

an add mode;

an add/drop mode; and an add/tapping mode.

19. The device according to claim 18, wherein the wavelength drop pathways operate when the optical switches are configured to select one of the drop mode and the add/drop mode;

the wavelength tapping pathways operate when the optical switches are configured to select one of the tapping mode and the add/tapping mode; and the wavelength add pathways operate when the optical switches are configured to select one of the add mode, the add/tapping mode, and the add/drop mode, wherein each of the wavelength drop pathways drops a specific wavelength channel contained in the input optical signal, each of the wavelength tapping pathways taps a specific wavelength channel of the input optical signal, and each of the wavelength add pathways adds a specific wavelength channel to the input optical signal.

20. The device according to claim 19, wherein a wavelength drop pathway dropping a specific wavelength channel from the input optical signal comprises:

a first wavelength selection device capable of receiving the input optical signal through the 1×M optical switch and selecting the specific wavelength channel to be dropped from the input optical signal;

a first M×1 optical switch having one of its M input ports connecting to the first wavelength selection device and being configured to direct the selected wavelength channel to its output port;

a 1×2 optical switch with its input connecting to the output port of the first M×1 optical switch and being configured to select its second selectable output; and a 2×1 optical switch connecting, through its first selectable input, to the second selectable output of the 1×2 optical switch, wherein the first wavelength selection device is capable of separating the specific wavelength channel to be dropped from the received input optical signal, directing the separated wavelength channel to the first M×1 optical switch, and producing an updated optical signal with at least one remaining wavelength channel after the specific wavelength channel is separated.

21. The device according to claim 20, further comprising:
a second M×1 optical switch with one of its M input ports connecting to the first wavelength selection device and direct the updated optical signal to its output port; and
a second wavelength selection device connection to the output of the second M×1 optical switch, wherein
the second wavelength selection device allows the updated optical signal to travel through.

22. The device according to claim 21, wherein the first and the second wavelength selection device comprises one of
a thin film filter; and
a fiber Bragg grating filter.

23. The device according to claim 22, wherein the fiber Bragg grating filter has a tunable controller through which the wavelength that the grating reflects can be adjusted.

24. The device according to claim 20, further comprising a first optical attenuator connecting to the output of the 2×1 optical switch, wherein the first optical attenuator is capable of receiving the specific wavelength channel to be dropped from the output of the 2×1 optical switch and attenuating the wavelength channel before dropping the wavelength channel.

25. The device according to claim 24, wherein the first optical attenuator is a variable optical attenuator.

26. The device according to claim 19, wherein a wavelength tapping pathway designed to tap a specific wavelength channel comprises:
a first wavelength selection device capable of receiving the input optical signal through the 1×M optical switch and selecting the specific wavelength channel to be tapped from the input optical signal;
a first M×1 optical switch having one of its M input ports connecting to the first wavelength selection device and being configured to direct the selected wavelength channel to its output port;
a 1×2 optical switch with its input connecting to the output port of the first M×1 optical switch and being configured to select its second selectable output;
a power splitter with its input connecting to the second selectable output of the 1×2 optical switch; and
a 2×1 optical switch being configured to select its second selectable input connecting to one of the outputs of the power splitter, wherein
the power splitter is capable of splitting the power of the specific wavelength channel, selected by the first wavelength selection device, to produce two portions of the selected specific wavelength channel, each of the portions corresponding to a certain amount of power of the selected wavelength channel.

27. The device according to claim 26, wherein the power splitter is a coupler.

28. The device according to claim 26, further comprising a first optical attenuator connecting to the output of the 2×1 optical switch, receiving one portion of the selected wavelength channel, and attenuating the received portion of the selected wavelength channel before dropping the portion of the selected wavelength channel.

29. The device according to claim 28, further comprising the 2×M optical switch with one of its input ports connecting to the power splitter to receive the other portion of the selected specific wavelength channel to be tapped and direct the other portion of the selected wavelength channel to a second wavelength selection device.

30. The device according to claim 19, wherein a wavelength add pathway designed to add a specific wavelength channel comprises:
a second attenuator receiving the specific wavelength channel to be added;
the 2×M optical switch with one of its input ports connecting to the second attenuator to receive the specific wavelength channel and directing the specific wavelength channel to one of its output ports;
a second wavelength selection device connecting to the one of the output ports of the 2×M optical switch, wherein
the second attenuator attenuates the specific wavelength before the wavelength is to be added, and
the second wavelength selection device allows the specific wavelength to be added to the input optical signal.

31. A configurable optical add/drop multiplexer assembly, comprising;
a plurality of configurable optical add/drop multiplexer (C-OADM) devices as recited in any one of claims 1–30; and
at least one connecting switch capable of being configured to allow an input optical signal to travel through at least one of the plurality of C-OADM devices;
wherein the plurality of C-OADM devices are arranged in a parallel fashion via the at least one connecting switch.

32. A consolidated information distribution system, comprising:
a consolidated information distribution center capable of aggregating signals carried on a plurality of optical channels into an optical signal and transmitting the optical signal via at least one optical fiber; and
at least one head end, each of which being capable of receiving the optical signal and obtaining content from the optical signal through a configurable optical add/drop multiplexer (C-OADM) device as recited in any one of claims 1–30;
wherein the at least one head end and the consolidated information distribution center is arranged in at least one of:
a linear configuration in which the at least one head end is arranged in a serial fashion and the optical signal is transported from the consolidated information distribution center to the at least one head end in a direction from a first head end to a last head end;
a star configuration in which the optical signal from the consolidated information distribution center is transported via the at least one optical fiber directly to every head end of the at least one head end; and
a ring configuration in which the at least one head end is arranged in a circular fashion, wherein the optical signal from the consolidated information distribution center is transported to the at least one head end in both a first direction from a first head end to a last head end and a second direction from the last head end to the first head end;
wherein the linear configuration further comprising a second consolidated information distribution center connecting to the at least one head end arranged in the serial fashion via the at least one optical fiber, wherein the optical signal is transported from the second consolidated information distribution center to the at least one head end in a direction from the last head end to the first head end;

wherein the star configuration further comprising a second consolidated information distribution center connecting to the at least one head end in the star configuration via at least one optical fiber, wherein the optical signal from the second consolidated information distribution center is transported directly to every head end of the at least one head end; and wherein each head end deploys an optical signal switch to select a consolidated information distribution center as a source of the input optical signal before directing the input optical signal to the C-OADM device.

33. A consolidated information distribution system, comprising:

a consolidated information distribution center capable of aggregating signals carried on a plurality of optical channels into an optical signal and transmitting the optical signal via at least one optical fiber: and at least one head end, each of which being capable of receiving the optical signal and obtaining content from the optical signal through a configurable optical add/drop multiplexer (C-OADM) device; wherein each of the C-OADM device comprises:

a plurality of optical switches configured to perform the at least one of adding a wavelength, dropping a wavelength, tapping an input optical signal with at least one wavelength, and a combination thereof;

at least one wavelength drop pathway, each of which allows a wavelength channel contained in an input optical signal to be dropped;

at least one wavelength tapping pathway, each of which allows a wavelength channel contained in the input optical signal to be partially tapped and partially dropped; and at least one wavelength add pathway, each of which allows a wavelength channel to be added to the input optical signal.

* * * * *